United States Patent
Murray et al.

(10) Patent No.: US 12,163,428 B2
(45) Date of Patent: Dec. 10, 2024

(54) MICROWAVE ENERGY APPLICATOR

(71) Applicant: Off-World, Inc., Pasadena, CA (US)

(72) Inventors: James Jason Murray, Liege (BE); Mohsen Yazdani, Los Angeles, CA (US); Farbod Ebrahimi, Los Angeles, CA (US); Jeandré du Plessis, Johannesburg (ZA); Hugo Jean Curto, Lyons (FR)

(73) Assignee: Off-World, Inc., Altadena, CA (US)

( * ) Notice: Subject to any disclaimer, the term of this patent is extended or adjusted under 35 U.S.C. 154(b) by 234 days.

(21) Appl. No.: 17/651,629

(22) Filed: Feb. 18, 2022

(65) Prior Publication Data

US 2022/0268155 A1     Aug. 25, 2022

Related U.S. Application Data

(60) Provisional application No. 63/152,248, filed on Feb. 22, 2021, provisional application No. 63/152,294, (Continued)

(51) Int. Cl.
*E21C 37/16*     (2006.01)
*B25J 18/00*     (2006.01)
(Continued)

(52) U.S. Cl.
CPC .............. *E21C 37/16* (2013.01); *B25J 18/00* (2013.01); *E21D 9/1073* (2013.01); *H05B 6/701* (2013.01);
(Continued)

(58) Field of Classification Search
CPC ....... E21C 37/16; E21C 37/18; E21D 9/1073; B25J 9/06; B25J 18/00; H05B 6/701;
(Continued)

(56) References Cited

U.S. PATENT DOCUMENTS 2,433,011 A    12/1947   Zaleski
2,830,276 A     4/1958   Zaleski
(Continued)

FOREIGN PATENT DOCUMENTS

CN     104563883      4/2015
CN     107035316 A  *   8/2017  ............... E21B 7/00
(Continued)

OTHER PUBLICATIONS

Brodie et al., "Development of Microwave Slow-Wave Comb Applicators for Soil Treatment at Frequencies 2.45 and 0.922 GHz (Theory, Design, and Experimental Study)", Agriculture, 2020, vol. 10, No. 604, pp. 17.
(Continued)

*Primary Examiner* — Janine M Kreck
*Assistant Examiner* — Michael A Goodwin
(74) *Attorney, Agent, or Firm* — Knobbe, Martens, Olson & Bear, LLP

(57) ABSTRACT

Systems, devices, and methods for a microwave energy applicator. The applicator may define an internal channel having one or more longitudinal ridges inside the channel configured to focus energy. The ridges may be moveable. A reflector may be located near an exit of the applicator. In some embodiments, the applicator may define a channel having a decrease in cross-sectional area with a dielectric filler therein, acting to transition from a lower to a higher permittivity material. The various embodiments of the applicator may be attached to a waveguide, which may be an articulable robotic arm having rotatable waveguide segments attached with a microwave generator. The applicator may alter an energy level of microwaves travelling therethrough, for example, to concentrate the energy for application at a rock face in a mine site.

34 Claims, 15 Drawing Sheets

Related U.S. Application Data filed on Feb. 22, 2021, provisional application No. 63/152,253, filed on Feb. 22, 2021.

(51) Int. Cl.

| | | |
|---|---|---|
| *E21D 9/10* | (2006.01) | |
| *H05B 6/70* | (2006.01) | |
| *E21C 37/18* | (2006.01) | |
| *H01Q 21/00* | (2006.01) | |

(52) U.S. Cl.
CPC .............. *H05B 6/707* (2013.01); *E21C 37/18* (2013.01); *H01Q 21/005* (2013.01)

(58) Field of Classification Search
CPC ......... H05B 6/705; H05B 6/707; H01P 1/062; E21B 7/14; E21B 7/15
See application file for complete search history.

(56) References Cited

U.S. PATENT DOCUMENTS

| | | | | |
|---|---|---|---|---|
| 3,430,021 | A | * | 2/1969 | Watson ................ B28D 1/221 |
| | | | | 125/1 |
| 3,443,051 | A | | 5/1969 | Puschner |
| 3,784,777 | A | * | 1/1974 | Soulier ................ H05B 6/788 |
| | | | | 219/696 |
| 4,020,431 | A | | 4/1977 | Saunders |
| 4,222,017 | A | | 9/1980 | Foldes |
| 4,365,252 | A | | 12/1982 | Hubert |
| 4,475,023 | A | | 10/1984 | Iwabuchi et al. |
| 4,647,884 | A | | 3/1987 | Lang et al. |
| 4,848,482 | A | | 7/1989 | Oberle et al. |
| 4,856,598 | A | | 8/1989 | Oberle et al. |
| 5,003,144 | A | | 3/1991 | Lindroth et al. |
| 5,198,828 | A | | 3/1993 | West et al. |
| 5,245,301 | A | | 9/1993 | Portrait et al. |
| 5,442,329 | A | | 8/1995 | Ghosh et al. |
| 5,635,143 | A | * | 6/1997 | White .................... E01C 23/08 |
| | | | | 588/900 |
| 5,671,045 | A | | 9/1997 | Woskov et al. |
| 6,114,676 | A | | 9/2000 | Jerby et al. |
| 6,377,872 | B1 | | 4/2002 | Struckman |
| 7,410,485 | B1 | | 8/2008 | Fink et al. |
| 8,547,290 | B2 | | 10/2013 | Schertz et al. |
| 8,976,072 | B2 | | 3/2015 | Lenormand et al. |
| 9,013,359 | B2 | | 4/2015 | Lenormand et al. |
| 9,970,246 | B2 | | 5/2018 | Price Hoelscher et al. |
| 10,103,417 | B2 | | 10/2018 | Gomberg |
| 10,428,654 | B2 | | 10/2019 | Feng et al. |
| 10,812,142 | B2 | | 10/2020 | Vannucci et al. |
| 11,028,647 | B2 | | 6/2021 | Batarseh |
| 11,222,770 | B2 | | 1/2022 | Kamarehi et al. |
| 2002/0090268 | A1 | | 7/2002 | Haller |
| 2005/0127068 | A1 | | 6/2005 | Tang et al. |
| 2007/0191825 | A1 | | 8/2007 | Cronin et al. |
| 2008/0093358 | A1 | | 4/2008 | Lee et al. |
| 2009/0321132 | A1 | | 12/2009 | Ouellet et al. |
| 2010/0258429 | A1 | | 10/2010 | Ugolin |
| 2011/0095959 | A1 | | 4/2011 | Schertz et al. |
| 2012/0010609 | A1 | | 1/2012 | Deem et al. |
| 2012/0235882 | A1 | | 9/2012 | Iverson et al. |
| 2012/0287006 | A1 | | 11/2012 | Lenormand et al. |
| 2013/0057431 | A1 | | 3/2013 | Lenormand et al. |
| 2013/0081875 | A1 | | 4/2013 | Hyde et al. |
| 2013/0123772 | A1 | | 5/2013 | Bonn et al. |
| 2013/0223931 | A1 | | 8/2013 | Hegg |
| 2015/0130565 | A1 | | 5/2015 | Henderson et al. |
| 2016/0244861 | A1 | | 8/2016 | Hyde et al. |
| 2016/0333691 | A1 | | 11/2016 | Puura |
| 2018/0214205 | A1 | | 8/2018 | Williams et al. |
| 2019/0040741 | A1 | * | 2/2019 | Feng ...................... E21C 37/16 |
| 2020/0063040 | A1 | | 2/2020 | Soane et al. |
| 2020/0128837 | A1 | | 4/2020 | Dev et al. |
| 2020/0195304 | A1 | | 6/2020 | Vannucci et al. |
| 2020/0240267 | A1 | | 7/2020 | Sercel et al. |
| 2021/0262455 | A1 | | 8/2021 | Hummelt |
| 2022/0268156 | A1 | | 8/2022 | Murray et al. |
| 2022/0268157 | A1 | | 8/2022 | Murray et al. |

FOREIGN PATENT DOCUMENTS

| | | | | |
|---|---|---|---|---|
| CN | 107218054 | | 9/2017 | |
| CN | 107218054 | A * | 9/2017 | ............... E21D 9/10 |
| CN | 111146546 | A * | 5/2020 | ............... H01P 3/00 |
| CN | 111163545 | | 5/2020 | |
| CN | 111636874 | | 9/2020 | |
| CN | 111934061 | | 11/2020 | |
| CN | 112302535 | | 2/2021 | |
| CN | 213714112 | | 7/2021 | |
| CN | 113090268 | | 1/2022 | |
| EP | 0 284 911 | | 10/1988 | |
| EP | 0 266 292 | | 7/1991 | |
| EP | 0 514 251 | | 8/1995 | |
| EP | 1 490 525 | | 12/2007 | |
| EP | 2 232 624 | | 8/2011 | |
| EP | 2 345 013 | | 4/2017 | |
| EP | 2 532 046 | | 3/2020 | |
| EP | 2 532 050 | | 5/2020 | |
| GB | 1 216 654 | | 12/1970 | |
| WO | WO 97/013141 | | 4/1997 | |
| WO | WO 99/056642 | | 11/1999 | |
| WO | WO 00/049957 | | 8/2000 | |
| WO | WO 2004/112628 | | 12/2004 | |
| WO | WO 2009/083440 | | 7/2009 | |
| WO | WO 2011/095384 | | 8/2011 | |
| WO | WO 2011/095425 | | 8/2011 | |
| WO | WO 2021/103768 | | 6/2021 | |
| WO | WO 2022/178220 | | 8/2022 | |
| WO | WO 2022/178221 | | 8/2022 | |
| WO | WO 2022/178222 | | 8/2022 | |

OTHER PUBLICATIONS

Flexible Waveguide, Microwaves101.com, 2015, pp. 4. https://www.microwaves101.com/encyclopedias/flexible-waveguide.

Hassani et al., "The Influence of Microwave Irradiation on Rocks for Microwave-Assisted Underground Excavation", Journal of Rock Mechanics and Geotechnical Engineering, 2016, vol. 8, pp. 15.

Hilton et al., "The Potential of High Power Lasers for Tube Cutting and Concrete Scabbling in Nuclear Decommissioning", TWI Global, Jan. 28, 2014, pp. 6. https://web.archive.org/web/20140128160659/http://www.twi-global.com/technical-knowledge/published-papers/the-potential-of-high-power-lasers-for-tube-cutting-and-concrete-scabbling-in-nuclear-decommissioning/.

Kahraman et al., "Microwave-Assisted Hard Rock Excavation", TunnelTalk, Jan. 25, 2018, pp. 6. https://www.tunneltalk.com/TunnelTECH-Jan2018-Microwave-assisted-hard-rock-excavation.php.

Kubel, Ed., "Advancements in Microwave Heating", IndustrialHeating.com, Jan. 2005, pp. 43-53.

Lu et al., "The Microwave-Induced Fracturing of Hard Rock", Rock Mechanics and Rock Engineering, 2019, pp. 16.

Nekoovaght et al., "Microwave Assisted Rock Breakage for Space Mining", Earth and Space 2014, American Society of Civil Engineers, 2015, pp. 414-423.

Richardson Electronics, "General Guidelines for the Configuration and Selection of Microwave Generators and Waveguide Components", Aug. 23, 2016, pp. 6. https://web.archive.org/web/20160823201513/https://www.relltubes.com/filebase/en/src/Literature/Configuration-and-Selection-of-MicrowaveGenerators-and-Waveguide-Components.pdf.

Rotary Joints, Microwaves101.com, Mar. 21, 2015, pp. 3. https://web.archive.org/web/20150321215951/https://www.microwaves101.com/encyclopedias/rotary-joints.

Tang et al., "Study of 5.8 GHz Magnetron in Asphalt Pavement Maintenance", Journal of Electromagnetic Waves and Applications, vol. 22, No. 14, 2008, pp. 1975-1984.

International Search Report and Written Opinion in PCT/US2022/016934 dated Jun. 22, 2022.

(56) References Cited

OTHER PUBLICATIONS

International Search Report and Written Opinion in PCT/US2022/016932 dated May 16, 2022.
International Search Report and Written Opinion in PCT/US2022/016933 dated Jun. 2, 2022.
Teimoori et al., "Twenty Years of Experimental and Numerical Studies on Microwave-Assisted Breakage of Rocks and Minerals—A Review", Nov. 30, 2020, https://arxiv.org/ftp/arxiv/papers/2011/2011.14624.pdf, pp. 43.

* cited by examiner

MICROWAVE ENERGY APPLICATOR

INCORPORATION BY REFERENCE TO ANY PRIORITY APPLICATIONS

Any and all applications for which a foreign or domestic priority claim are identified in the Application Data Sheet as filed with the present application are hereby incorporated by reference under 37 CFR 1.57. For example, this application claims the benefit of U.S. Provisional Application No. 63/152,253, filed Feb. 22, 2021, titled MICROWAVE ENERGY APPLICATOR, of U.S. Provisional Application No. 63/152,294, filed Feb. 22, 2021, titled APPLICATION OF MICROWAVE ENERGY DIRECTLY TO A ROCK FACE UNDERGROUND, and U.S. Provisional Application No. 63/152,248, filed Feb. 22, 2021, titled ARTICULATED WAVEGUIDE, the entire content of each of which is incorporated by reference herein and made a part of this specification for all purposes.

BACKGROUND

Field

The development generally relates to energy applicators, in particular to microwave energy applicators, which may be used in microwave-based systems for mining rock, among other applications.

Description of the Related Art

When microwave energy is applied to a material, the energy of the microwaves may be absorbed and result in thermomechanical effects as it penetrates the material. Typically, the microwave energy is guided via a waveguide and the microwaves are applied over a large area and with significant reflection, resulting in energy loss, among other drawbacks. Therefore, there is a need for an improved microwave energy applicator to address these and other drawbacks of existing solutions.

SUMMARY

The embodiments disclosed herein each have several aspects, of which no single one is solely responsible for the disclosure's desirable attributes. Without limiting the scope of this disclosure, the prominent features are briefly discussed herein. After considering this discussion, and particularly after reading the section entitled "Detailed Description," one will understand how the features of the embodiments described herein provide advantages over existing systems, devices, and methods relating to microwave energy applicators.

The following disclosure describes non-limiting examples of some embodiments. For instance, other embodiments of the disclosed device, systems and methods may or may not include the features described herein. Moreover, disclosed advantages and benefits may apply only to certain embodiments of the invention and should not be used to limit the disclosure.

Systems, devices and methods are described for a microwave energy applicator. The applicator may define an internal channel having one or more longitudinal ridges inside the channel configured to focus energy. The ridges may be moveable. A reflector may be located near an exit of the applicator. In some embodiments, the applicator may define a channel having a decrease in cross-sectional area with a dielectric filler therein, acting to transition from a lower to a higher permittivity material. The various embodiments of the applicator may be attached to a waveguide, which may be an articulable robotic arm having rotatable waveguide segments attached with a microwave generator. The applicator may alter an energy level of microwaves travelling therethrough, for example, to concentrate the energy for application at a rock face in a mine site.

In one aspect, a microwave-based system for mining rock may include a microwave generator, a robotic arm, and an applicator. The robotic arm is connected with the generator and includes a waveguide segment configured to guide therethrough microwaves generated by the microwave generator. The applicator, located at an end of the robotic arm, defines a longitudinal channel configured to guide therethrough microwaves from the waveguide segment through an exit for application to the rock. At least a portion of the channel includes at least one longitudinal ridge protruding into the channel and configured to alter an energy level of the microwaves.

Various embodiments of the various aspects may be implemented. For example, in some embodiments, the ridge may abut at least one inner wall of the channel;

In some embodiments, the ridge may include a proximal portion located near an inlet of the channel; The ridge may also include a distal portion located near an outlet of the channel, and a middle portion located between the proximal portion and the distal portion; A cross-sectional thickness of the ridge, protruding into the channel, may increase from the proximal portion to the middle portion;

In some embodiments, the cross-sectional thickness of the ridge, protruding into the channel, may decrease from the middle portion to the distal portion;

In some embodiments, at least a part of the distal portion may include a planar surface located at the outlet of the channel;

In some embodiments, the outlet may include a window; The planar surface may form at least one edge of the window;

In some embodiments, the ridge may include a smooth outer surface facing away from the abutting inner channel wall;

In some embodiments, the outer surface of the ridge may be curved;

In some embodiments, the ridge may taper inwardly at or near the distal portion;

In some embodiments, at least a part of the ridge may include an airfoil shape;

In some embodiments, the microwave-based system may include two of the longitudinal ridges;

In some embodiments, the two ridges may be located on opposite inner walls of the channel;

In some embodiments, the ridge may include internal voids;

In some embodiments, the ridge may be movable;

In some embodiments, the ridge may be movable along a length of the channel;

In some embodiments, a movement of the ridge may be continuous;

In some embodiments, a movement of the ridge may be discrete;

In some embodiments, a movement of the ridge may be controlled by a control system configured to move the ridge;

In some embodiments, a movement of the ridge may control the energy level alteration of the microwaves;

In some embodiments, the applicator may be configured to focus the microwaves to a beam;

In some embodiments, the microwave-based system may include a reflector connected at an outlet of the channel;

In some embodiments, the microwave-based system may include a dust cover connected to the reflector and covering the outlet of the channel;

In some embodiments, the dust cover may include a microwave transparent material;

In some embodiments, at least a portion of a cross-sectional area of the channel may narrow from an inlet of the channel to an outlet of the channel;

In some embodiments, a cross-sectional area of an outlet of the channel may be smaller than a cross-sectional area of the waveguide segment;

In some embodiments, the robotic arm may be articulable and may include at least two rigid waveguide segments rotatably attached together; and/or In some embodiments, the microwave-based system may include a control system configured to move the robotic arm to control a location of the applicator.

In another aspect, a method of applying microwaves to rock may include generating microwaves, guiding the microwaves through a waveguide, receiving the microwaves from the waveguide into an applicator, and focusing the microwaves into the rock. The applicator may include a longitudinal channel and at least one ridge protruding into the channel a first distance at a first location along the channel and a second distance at a second location along the channel that is greater than the first distance to alter an energy level of the microwaves.

Various embodiments of the various aspects may be implemented. For example, in some embodiments, the method may include re-orienting the applicator relative to the rock;

In some embodiments, the method may include increasing an energy density of the focused microwaves relative to the guided microwaves in the waveguide by at least five times;

In some embodiments, the method may include projecting a beam of the focused microwaves into a spot on a face of the rock that is no more than one quarter (¼) the size of a wavelength of the beam;

In some embodiments, the method may include causing a transmission loss of the microwave energy passing through the applicator that is no more than −30 decibels (dB);

In some embodiments, the method may include locating the applicator in a reactive near field acting as an energy concentrator within one wavelength of depth into the rock;

In some embodiments, the energy level of the microwaves may be altered due to a narrowing of a cross-sectional area of the channel from an inlet thereof to an outlet thereof;

In some embodiments, a varying thickness of the at least one ridge along a longitudinal length of the channel may cause the narrowing of the cross-sectional area of the channel. In some embodiments, the varying thickness of the at least one ridge may minimize reflection of microwaves back to the microwave generator;

In some embodiments, the energy level of the microwaves may be altered by a movement of the at least one ridge in a longitudinal direction of the channel;

In another aspect, an apparatus for focusing microwaves may include a body defining a longitudinal channel that extends from an inlet to an outlet, and at least one longitudinal ridge protruding into the channel from an inner wall of the body;

In some embodiments, the ridge may include a proximal portion located near an inlet of the channel; The ridge may also include a distal portion located near an outlet of the channel and a middle portion located between the proximal portion and the distal portion; A cross-sectional thickness of the ridge, protruding into the channel, may increase from the proximal portion to the middle portion;

In some embodiments, the cross-sectional thickness of the ridge protruding into the channel may decrease from the middle portion to the distal portion;

In some embodiments, at least a part of the distal portion may include a planar surface located at the outlet of the channel;

In some embodiments, the outlet may include a window; The planar surface may form at least one edge of the window;

In some embodiments, the ridge may include a smooth outer surface facing away from the abutting inner channel wall;

In some embodiments, the outer surface of the ridge may be curved;

In some embodiments, the ridge may taper inwardly at or near the distal portion;

In some embodiments, at least a part of the ridge may include an airfoil shape;

In some embodiments, the apparatus may include two of the longitudinal ridges;

In some embodiments, the two ridges may be located on opposite inner walls of the channel;

In some embodiments, the ridge may include internal voids;

In some embodiments, the ridge may be movable;

In some embodiments, the ridge may be movable along a length of the channel;

In some embodiments, a movement of the ridge may be continuous;

In some embodiments, a movement of the ridge may be discrete;

In some embodiments, a movement of the ridge may be controlled by a control system configured to move the ridge;

In some embodiments, a movement of the ridge may control the energy level alteration of the microwaves;

In some embodiments, the applicator may be configured to focus the microwaves to a beam;

In some embodiments, the apparatus may include a reflector connected at an outlet of the channel;

In some embodiments, the apparatus may include a dust cover connected to the reflector and covering the outlet of the channel;

In some embodiments, the dust cover may include a microwave transparent material.

In some embodiments, a cross-sectional area of the channel may narrow from the inlet of the channel to the outlet of the channel;

In some embodiments, a cross-sectional area of the inlet of the channel may be larger than a cross-sectional area of the outlet of the channel; and/or In some embodiments, the inlet of the channel may be configured to attach to a waveguide.

In another aspect, a microwave-based system for mining rock may include a microwave generator, a robotic arm, and an applicator. The robotic arm may be connected with the generator and may include a waveguide segment configured to guide therethrough microwaves generated by the microwave generator. The applicator may be located at an end of the robotic arm. The applicator may define a channel configured to guide therethrough microwaves from the waveguide segment through an exit for application to the rock. At least a portion of the channel that may decrease in cross-sectional area towards the exit may include an insert configured to alter an energy level of the microwaves.

Various embodiments of the various aspects may be included. For example, in some embodiments, the insert may be pyramidal;
- In some embodiments, the insert may include two pyramidal structures adjacent each other;
- In some embodiments, the insert may decrease in cross-sectional area towards the exit;
- In some embodiments, the insert may include a distal portion that may decrease in cross-sectional area towards the exit and a proximal portion that may decrease in cross-sectional area away from the exit;
- In some embodiments, the insert may include a dielectric filler;
- In some embodiments, the insert may include a microwave transparent material;
- In some embodiments, the insert may include Polytetrafluoroethylene (PTFE);
- In some embodiments, the waveguide segment may define a channel having a first permittivity, and the insert may have a second permittivity that is greater than the first permittivity;
- In some embodiments, the rock may have a third permittivity that is greater than the second permittivity;
- In some embodiments, the applicator may include a flange at the exit;
- In some embodiments, the flange may include a flat plate extending completely around the exit;
- In some embodiments, a first outer profile of the flange may be no larger than a second outer profile of a cross-section of the waveguide segment;
- In some embodiments, the applicator may be configured to focus the microwaves to a beam;
- In some embodiments, the robotic arm may be articulable and may include at least two rigid waveguide segments rotatably attached together; and/or
- In some embodiments, the microwave-based system may include a control system configured to move the robotic arm to control a location of the applicator.

In another aspect, a method of applying microwaves to rock may include generating microwaves, guiding the microwaves through a waveguide, receiving the microwaves from the waveguide into an applicator, and focusing the microwaves into the rock. The applicator may have an insert that may decrease in cross-sectional area in a direction of propagation of the microwaves to alter an energy level of the microwaves.

Various embodiments of the various aspects may be implemented. For example, in some embodiments, the method may include re-orienting the applicator relative to the rock;
- In some embodiments, the method may include increasing an energy density of the focused microwaves relative to the guided microwaves in the waveguide by at least five times;
- In some embodiments, the method may include projecting a beam of the focused microwaves into a spot on a face of the rock that is no more than one quarter (¼) the size of a wavelength of the beam;
- In some embodiments, the method may include causing a transmission loss of the microwave energy passing through the insert that is no more than −30 decibels (dB);
- In some embodiments, the method may include locating the applicator in a reactive near field acting as an energy concentrator within one wavelength of depth into the rock;

In another aspect, an apparatus for focusing microwaves may include a body defining a channel that extends from an inlet to an outlet; The inlet may have a larger cross-sectional area than the outlet; An insert may be located at least partially within the channel; The insert may include a microwave transparent material;
- In some embodiments, the outlet may include a window, with a planar surface of an end of the insert located at the window;
- In some embodiments, the inlet may have a rectangular cross-sectional profile;
- In some embodiments, the insert may decrease in cross-sectional area towards the outlet;
- In some embodiments, the insert may include a distal portion that may decrease in cross-sectional area towards the exit and a proximal portion that may decrease in cross-sectional area away from the exit;
- In some embodiments, the insert may include a first outer surface opposite a second outer surface, and a third outer surface opposite a fourth outer surface; A first relative distance between the first and second outer surfaces may decrease toward the outlet; A second relative distance between the third and fourth outer surfaces may decrease toward the outlet;
- In some embodiments, the apparatus may include a flange extending around the outlet; and/or
- In some embodiments, the inlet may be configured to attach to a waveguide.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, may be arranged, substituted, combined, and designed in a wide variety of different configurations, all of which are explicitly contemplated and made part of this disclosure.

DETAILED DESCRIPTION

The following detailed description is directed to certain specific embodiments of the microwave energy applicators, systems, and methods. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. The embodiments of the invention, examples of which are illustrated in the accompanying drawings, are set forth in detail below. Wherever possible, the same reference numbers are used throughout the drawings to refer to the same or like parts.

Described herein are systems, devices and methods relating to various embodiments of a microwave energy applicator. In some embodiments, the applicator may define an internal channel having one or more longitudinal ridges inside the channel configured to focus the energy. The ridges may be moveable. A reflector, which may be parabolic or other shapes, may be located near an exit of the applicator. In some embodiments, the applicator may define a channel having a decrease in cross-sectional area with a dielectric filler therein. The various embodiments of the applicator may be attached to a waveguide, which may be an articulable robotic arm having rotatable waveguide segments attached with a microwave generator. The applicator may alter an energy level of microwaves travelling therethrough, for example to concentrate the energy for application at a rock face in a mine site.

Figure 1A:
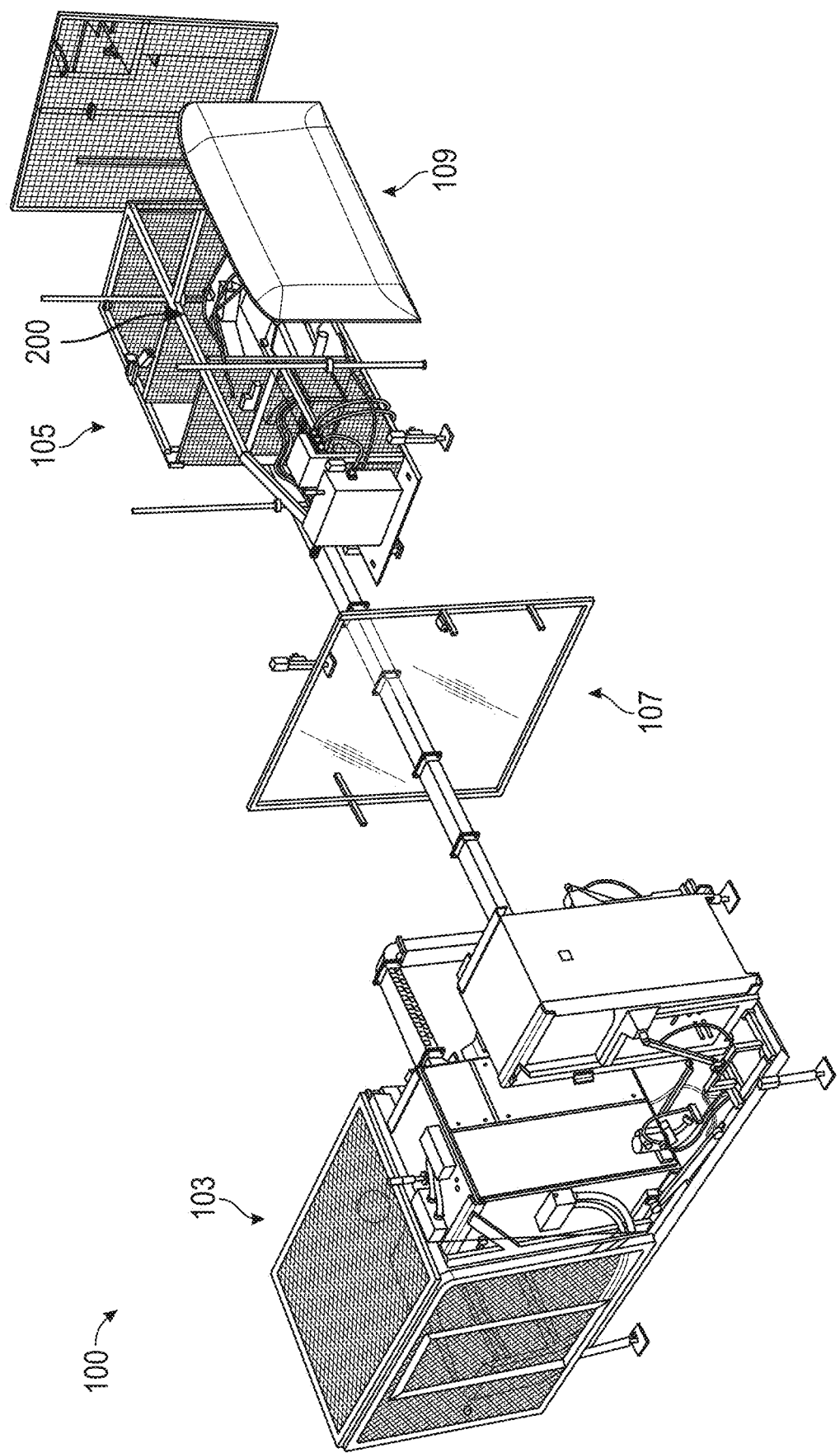
FIG. 1A is a perspective view of an embodiment of a microwave-based system for mining rock, having a robotic arm formed of waveguide segments with an applicator at the end of the arm.

FIG. 1A is a perspective view of an embodiment of a microwave-based system 100 for mining rock. The system 100 may include a microwave generator 103, an applicator skid 105, and/or a treatment room 107. The microwave generator 103 may produce microwaves that travel through a waveguide system 200 to an applicator, for application to rock 109. The applicator skid 105 may include a portion of the waveguide system 200 and an applicator. The waveguide system 200 may include rigid waveguides or waveguide segments configured to receive the generated microwaves therethrough and guide the microwaves to the applicator. The waveguide system 200 may include a stationary portion and a moving portion. The moving portion may be articulable and may include a plurality of rotatable segments located with the applicator skid 105. The applicator skid 105 may be positioned to face a layer of the rock 109 for mining, e.g., for pre-conditioning and/or excavation of the rock 109 using the microwave energy. The rotatable waveguide segments may be articulated to locate, position and/or move the applicator in a desired manner to apply the microwave energy to the rock. The treatment room 107 may include walls and/or shields configured to contain any leaks. "Articulation," as used herein, has its usual and customary meaning and includes without limitation rotation, translation, and orientation. The rock 109 may be in a mountain, a cave, a quarry, or other locations. In some embodiments, the microwave generator 103, applicator skid 105, and/or treatment room 107 may be mobile and configured to travel throughout a mine site.

Figure 1B:
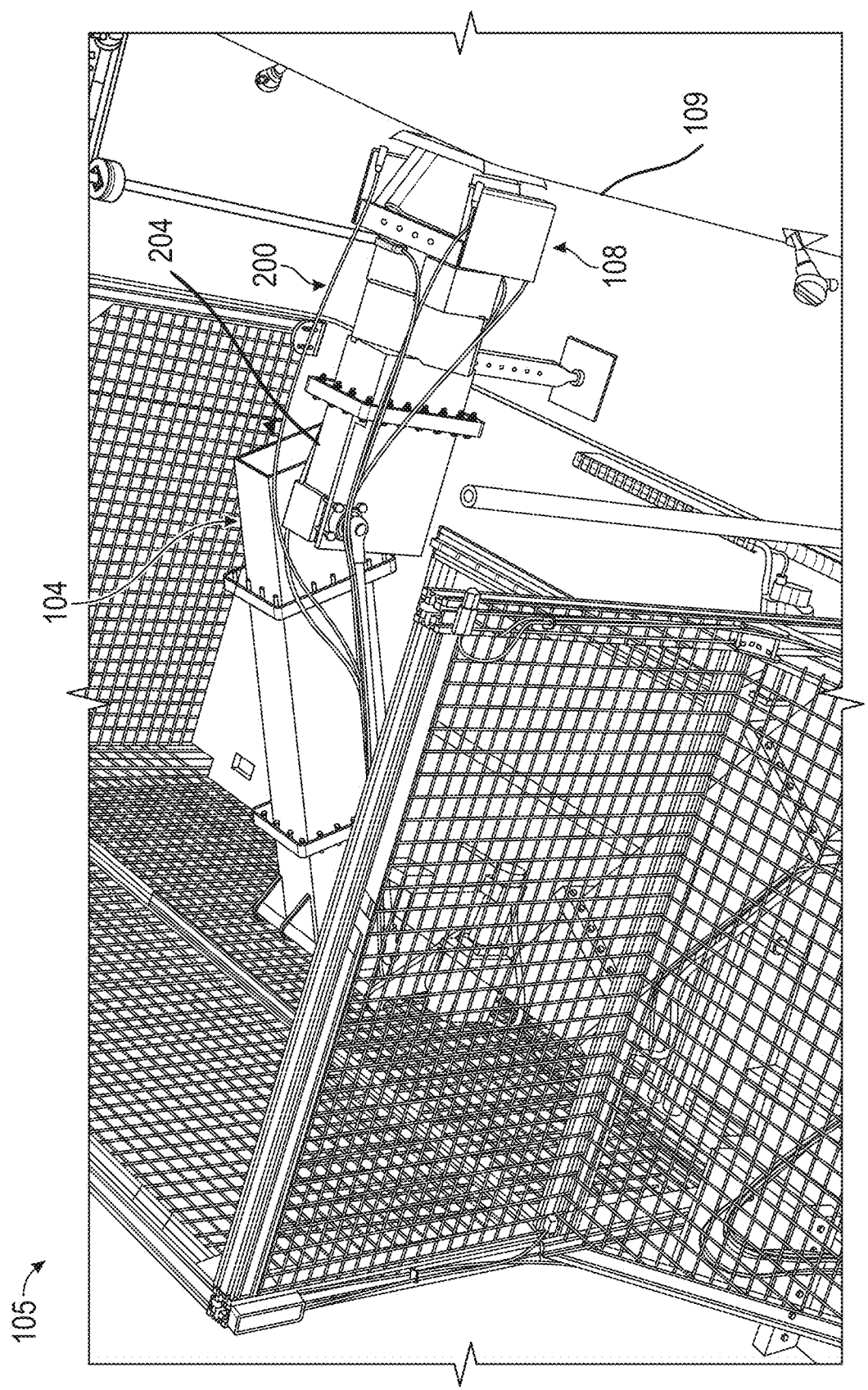
FIG. 1B is a perspective view of an applicator skid showing a part of the robotic arm and the applicator of FIG. 1A.

FIG. 1B is a perspective view of the applicator skid 105 showing a part of a robotic arm and the applicator of FIG. 1A. The applicator skid 105 may include the waveguide system 200. The waveguide system 200 may include an articulable robotic arm 104. The robotic arm 104 may be formed by a plurality of rigid waveguide segments 204. The robotic arm 104 may be in communication with, e.g. connected to, the microwave generator 103. The microwave generator 103 may generate microwaves that travel through an internal channel defined by the connected waveguide segments 204 of the robotic arm 104. The robotic arm 104 may be articulated by rotating one or more of the waveguide segments. There may be any number of the robotic arms 104.

The microwave-based system 100 may include one or more microwave applicators 108. The applicator 108 may be connected to the waveguide system 200. For example, the applicator 108 may be positioned at a distal end of the robotic arm 104. The applicator 108 may be connected to a terminal waveguide segment of the robotic arm 104. The applicator 108 may be configured to focus and/or concentrate the microwaves exiting the applicator, for example, to a beam, for application to the rock 109. The position and/or movement of the applicator relative to the rock 109 may be controlled by articulation of the robotic arm 104. A control system may control the robotic arm 104 to position and/or move the applicator 108 in a desired manner. The robotic arm 104 may be controlled such that the applicator 108 may have a desired orientation relative to the rock 109, distance from the rock 109, speed of travel along the rock 109, and/or direction of travel along the rock 109, etc.

Various features may be included with the microwave-based system 100, waveguide system 200, and applicator 108, for example any of the features described in U.S. Provisional Application No. 63/152,294 titled APPLICATION OF MICROWAVE ENERGY DIRECTLY TO A ROCK FACE UNDERGROUND and filed on Feb. 22, 2021, in U.S. patent application Ser. No. 17/651,733 titled MICROWAVE-BASED MINING SYSTEMS AND METHODS WITH ROBOTIC ARM WAVEGUIDE and filed on the same day as the present application, in U.S. Provisional Application No. 63/152,248 titled ARTICULATED WAVEGUIDE and filed on Feb. 22, 2021, in U.S. patent application Ser. No. 17/651,683 titled ARTICULATED WAVEGUIDE and filed on the same day as the present application, and in U.S. Provisional Application No. 63/152,253 titled MICROWAVE ENERGY APPLICATOR and filed Feb. 22, 2021, the entire content of each of which is incorporated by reference herein for all purposes and forms a part of this specification.

Figure 1C:
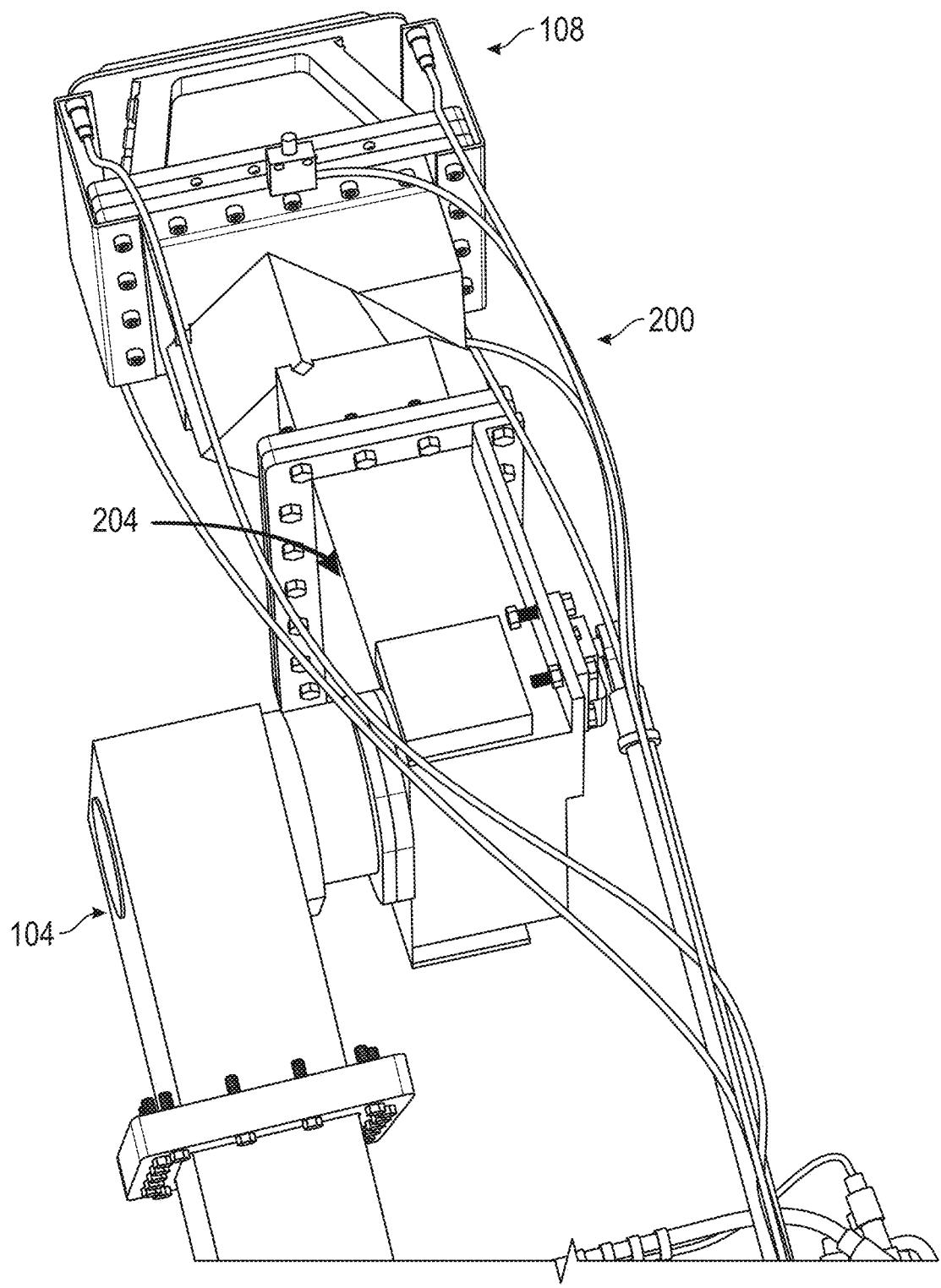
FIG. 1C is a closeup perspective view of a terminal portion of the robotic arm and the applicator of FIG. 1A.
Figure 1D:
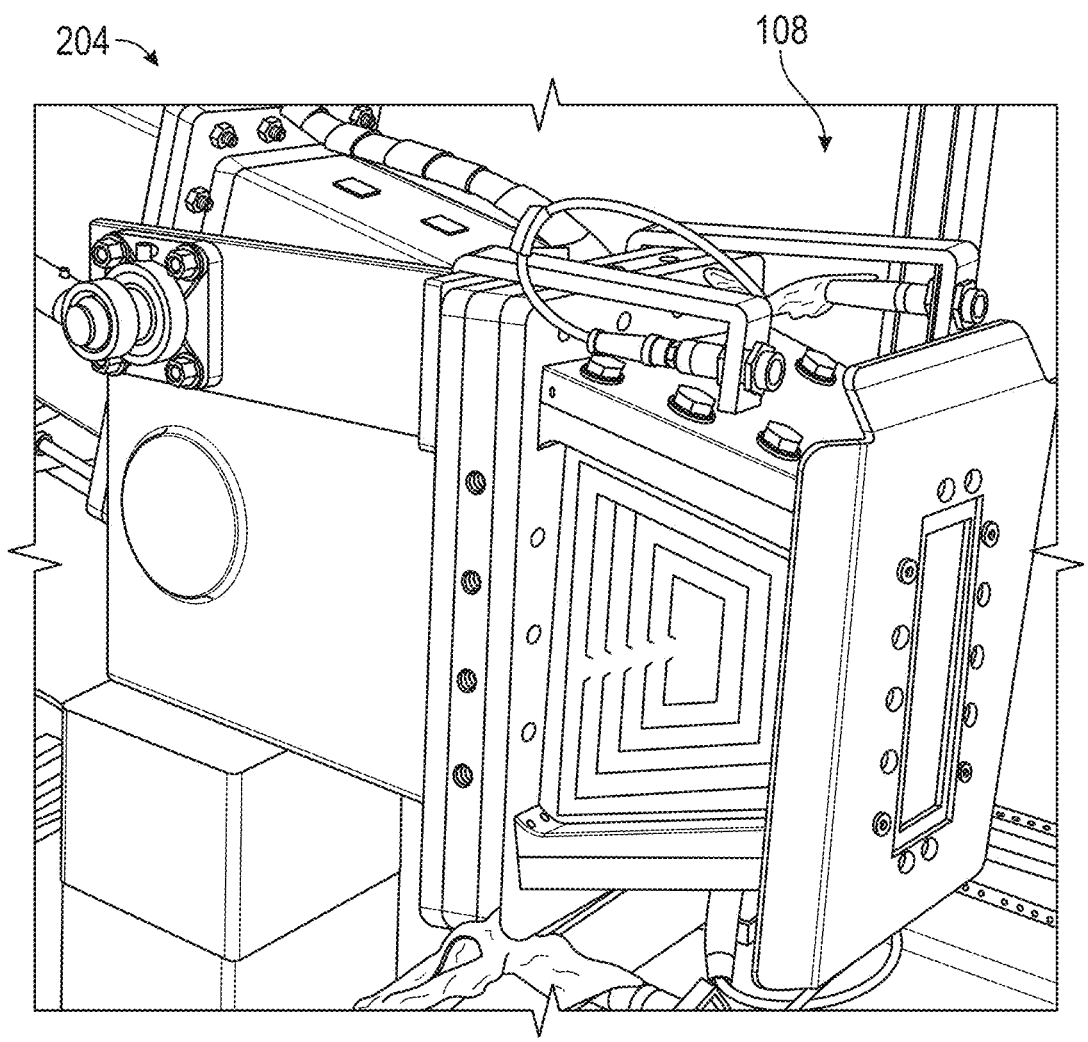
FIG. 1D is a closeup perspective view of the applicator of FIG. 1A having a narrowing channel and insert.

FIG. 1C is a closeup perspective view of a terminal portion of the robotic arm having an embodiment of a microwave energy applicator 108 attached thereto. FIG. 1D is a closeup perspective view of the applicator 108 of FIG. 1C. The applicator skid 105 of the microwave-based system 100 may include the waveguide system 200 or a portion thereof. The waveguide system 200 may include a plurality of rigid waveguide segments 204 forming an articulable robotic arm 104. The waveguide segment 204 as shown in FIGS. 1C and 1D may be a terminal waveguide segment that is positioned at an end of the robotic arm 104. The applicator 108 may be connected to this terminal waveguide segment 204. The robotic arm 104 may be connected to the generator 103, or otherwise in electromagnetic communication with the generator 103. The applicator 108 may be configured to receive the microwaves from the generator 103, via the waveguide segments 204 that form the robotic arm 104, and to focus the microwaves, e.g., to a beam, for application in and/or on the rock 109.

Figure 2:
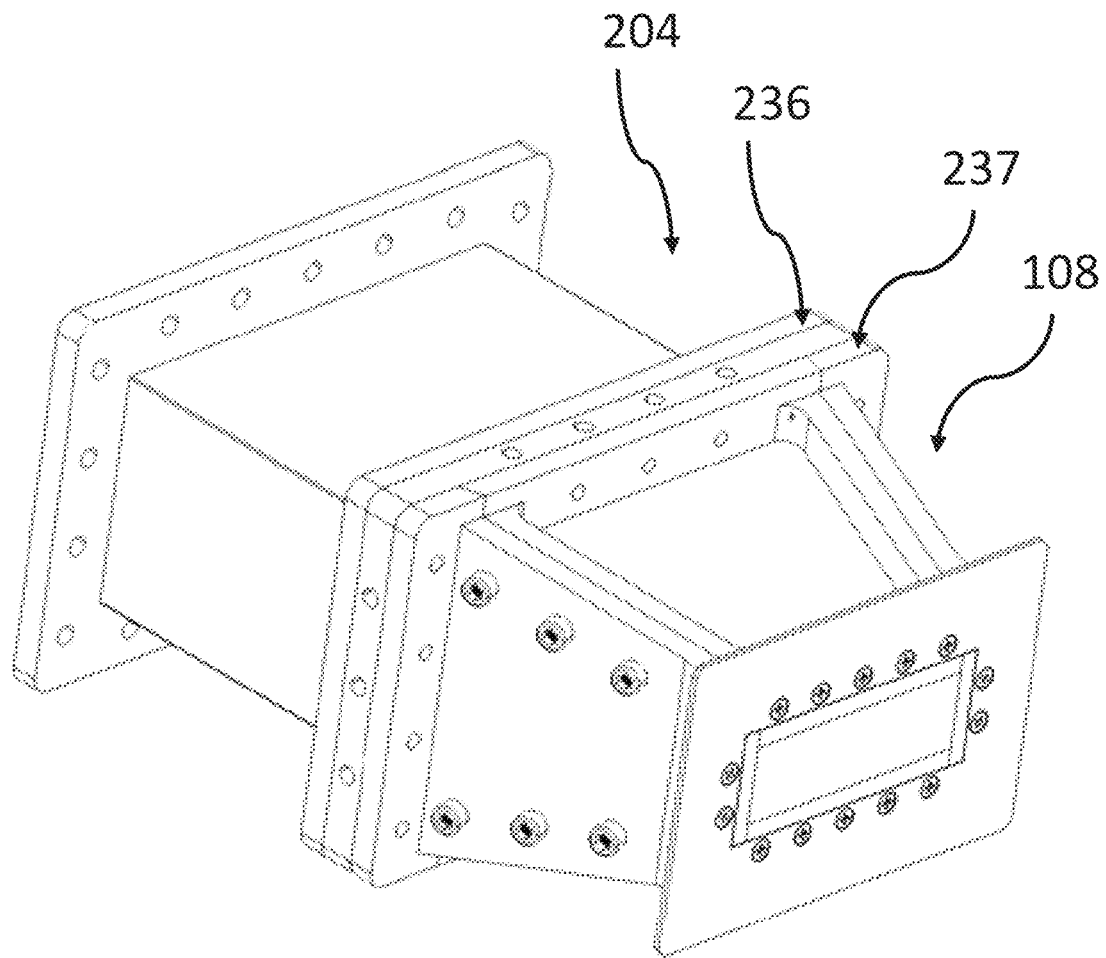
FIG. 2 is a perspective view of the applicator of FIG. 1A shown in isolation from the robotic arm.

FIG. 2 is a perspective view of the applicator 108 attached to the terminal waveguide segment 204 in isolation from the remainder of the waveguide system 200. The waveguide segment 204 may have a rectangular cross-section, or other shape. An internal channel defined by the waveguide segment 204 may thus be rectangular. The waveguide segment 204 may be positioned at an end of the robotic arm 104 and may include a first flange 236 attached to a second flange 237 of the applicator 108. One or more of the plurality of waveguide segments 204 may be included in the waveguide system 200 with similar flanges or similar attachments to attach the waveguide segments 204 to each other and/or to the microwave generator 103.

Figure 3:
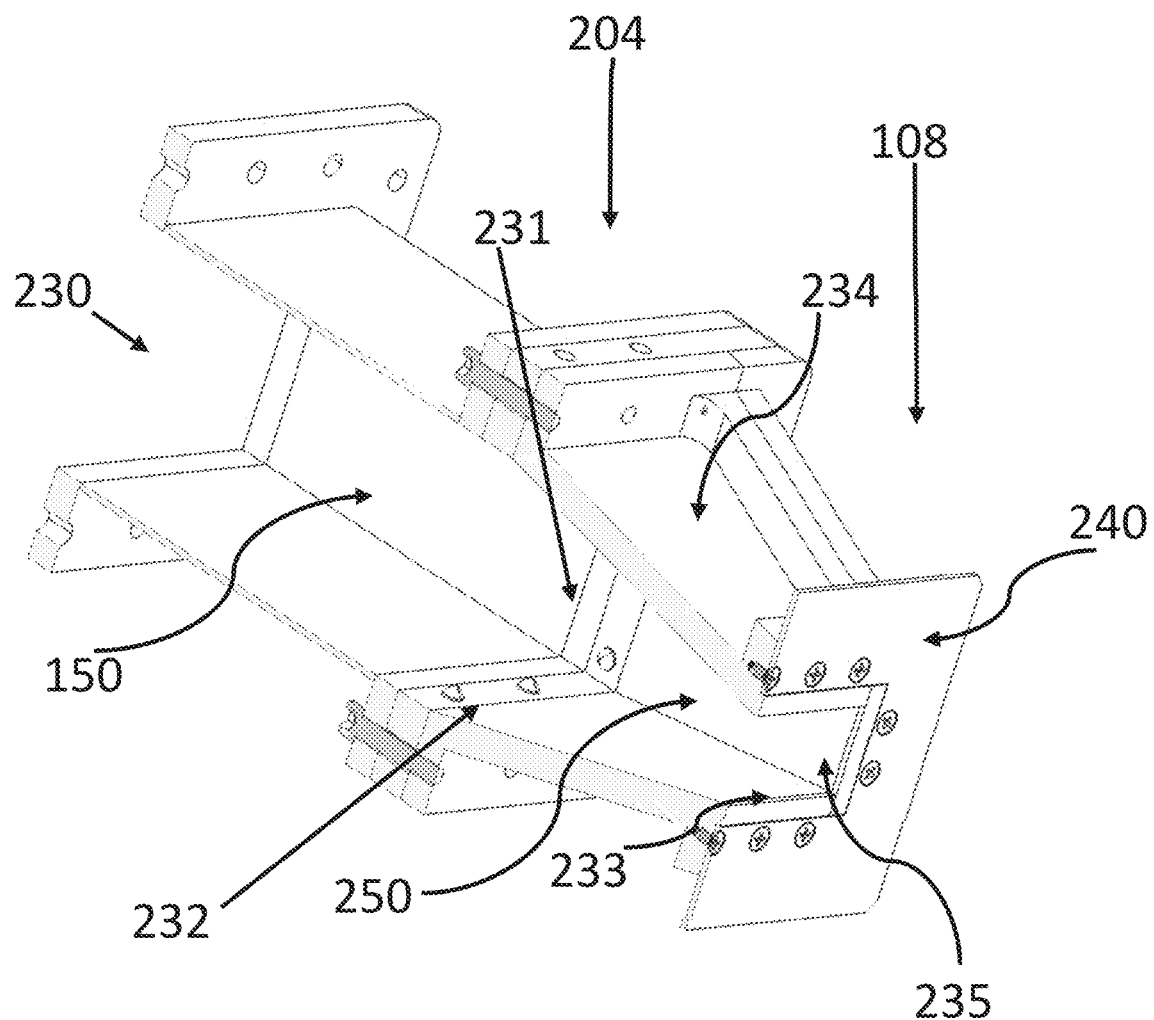
FIG. 3 is a cross-sectional perspective view of the applicator of FIG. 2.
Figure 4:
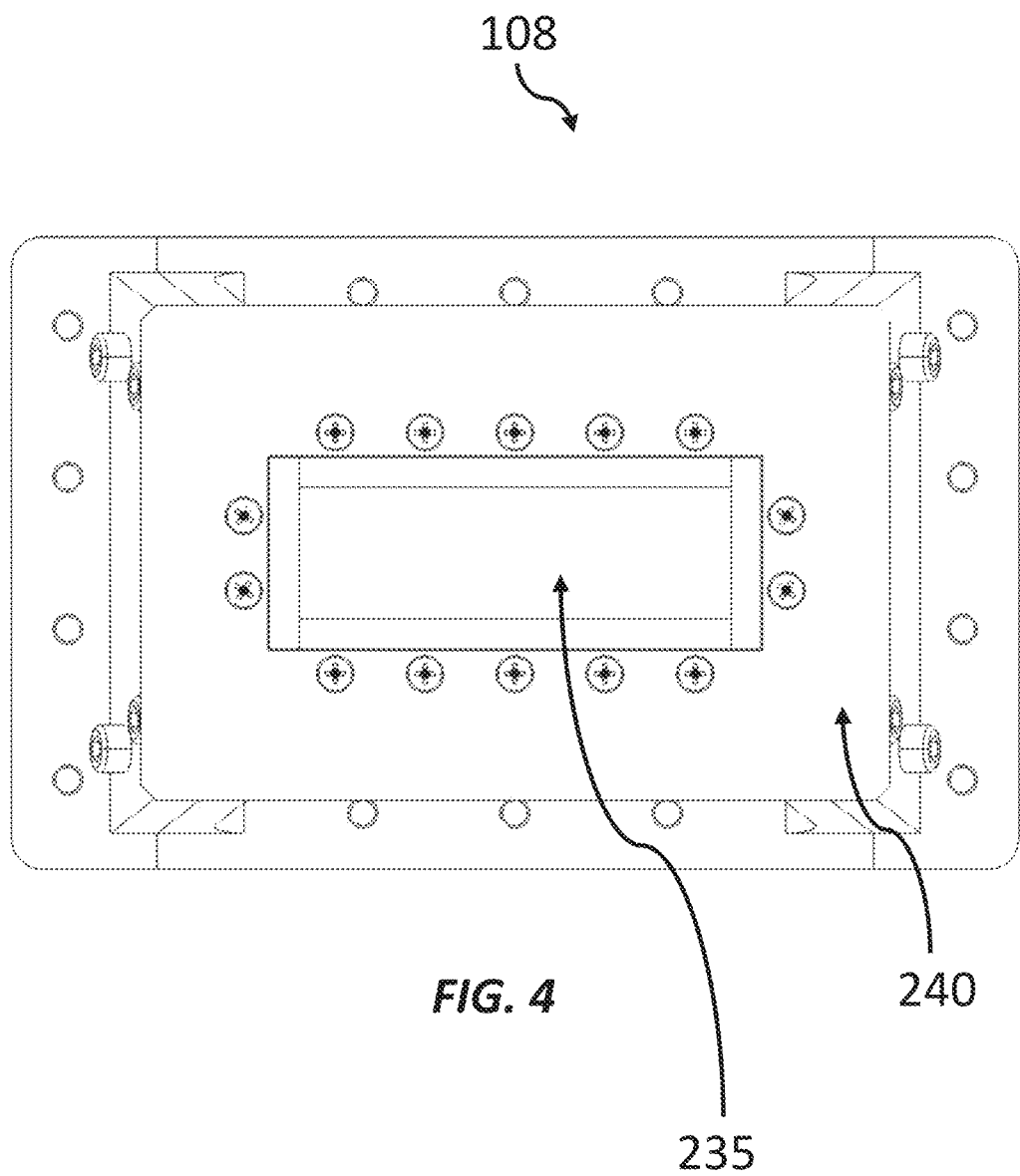
FIG. 4 is a front-end view of the applicator of FIG. 2.

FIG. 3 is a cross-sectional perspective view of the applicator 108. FIG. 4 is a front-end view of the applicator 108. The waveguide segment 204 may include a waveguide inlet 230 at a proximal end thereof and a waveguide outlet 231 at a distal end thereof. "Proximal" and "distal," as used herein, have their usual and customary meaning and include, without limitation, directions toward and away from, respectively, the microwave generator along the plurality of waveguide segments 204. The waveguide segment 204 may have different cross-sectional profiles, including, but not limited to, rectangular, circular, oval, and multiple-sided. Microwaves may enter the waveguide segment 204 at the waveguide inlet 230, travel through the waveguide segment 204 via a waveguide channel 150, exit the waveguide segment 204 at the waveguide outlet 231, and travel into or toward the applicator 108.

The microwave energy applicator 108 may include a body 234 defining a channel 250 that extends from an applicator inlet 232 to an applicator outlet 233. The applicator outlet 233 may be a distal termination of the robotic arm and/or applicator 233, such that located distally of the applicator outlet 233 is an external environment or space that is separate from the system 100 and applicator 108, such as an atmosphere or cave with a rock face. The channel 250 may be in electromagnetic communication with the waveguide channel 150 of the waveguide segments 204 forming the robotic arm 104. The space within the waveguide channel 150 may be continuous with the space within the channel 250. In some embodiments, the waveguide channel 150 may be in communication with an insert of the applicator 108. The applicator inlet 232 and applicator outlet 233 may have the same or different cross-sectional profiles, including, but not limited to, rectangular, circular, oval, and multi-sided. The applicator inlet 232 may have a larger cross-sectional area than the applicator outlet 233. The cross-sectional area of the channel 250 may narrow from the applicator inlet 232 to the applicator outlet 233.

The applicator inlet 232 and the waveguide outlet 231 may have the same or similar cross-sectional area. The applicator inlet 232 and the waveguide outlet 231 may be aligned so that the applicator 108 may be connected to the waveguide segment 204. A continuous channel with smooth inner surfaces of the sidewalls may be formed between the waveguide inlet 230 and the applicator outlet 233.

In some embodiments, the channel 250 from the applicator inlet 232 to the applicator outlet 233 may narrow. Such narrowing minimizes reflection of the microwave energy, for example, in a proximal direction back toward the terminal waveguide segment 204. In some embodiments, an angle of narrowing of the channel 250 from the applicator inlet 232 to the applicator outlet 233 may include an angle or angles of narrowing that allow different levels of collimation of a transmitted microwave beam.

The angles may be chosen to minimize reflection of the microwave energy back up the waveguide in the upstream direction. The taper towards the rock may affect how collimated the beam into the rock/material is. The angles may be chosen based on one or more of the following: frequency of the energy emitted, a size of the applicator, a mass of the applicator, expected or detected energy reflection, a desired amount of concentration of the beam at the distal end of the applicator, environmental parameters, and characteristics of the rock/material. Optimal angles may be chosen through a process of numerical simulation and testing. The angles of the channel may be the same or similar to the angles of abutting surfaces of the insert 260 therein. For example, in some embodiments, for a microwave frequency of about 916 MHz, an angle formed between two opposite walls of the distal pyramidal structure 260*a* may be about 116 degrees, which may also be the angle between the opposing inner surfaces of the narrowing channel of the body of the applicator 108. Further, in some embodiments, for a microwave frequency from about 916 MHz, an angle formed between two opposite walls of the proximal pyramidal structure 260*a* of the insert 260 may be about 26 degrees, as further described herein, for example with respect to FIG. 5D.

The applicator outlet 233 may form a beam window 235 through which the microwave beam may be transmitted. Transmission of the microwave energy received from the waveguide segment 204 through the narrow beam window 235 may allow concentration of the received energy by up to two, three, four, five, six, seven, eight, nine, ten times or more times relative to the energy within the waveguide channel 150. In some embodiments, dimensions of the beam window 235 may include dimensions that allow different levels of collimation of the transmitted microwave beam. The dimensions of the applicator 108 and/or the beam window 235 may be chosen based on a frequency of the transmitted energy. For example, at a frequency of 916 MHz, the dimensions of the beam window 235 may include a width of about 144 mm and a height of about 44 mm, which dimensions may correspond to particular angles of the insert. In some embodiments, the width of the window 235 may be from about 130 mm to about 160 mm, from about 135 mm to about 155 mm, from about 140 mm to about 150 mm, or about 145 mm. In some embodiments, the height of the window 235 may be from about 30 mm to about 60 mm, from about 35 mm to about 55 mm, from about 40 mm to about 50 mm, or about 45 mm. Waveguide dimensions may include industry standard dimensions. The dimensions of the applicator 108 and/or the beam window 235 may be chosen based on maintenance of a single mode transmission of the microwave beam. Further, the beam window sizes provided above may correspond to particular angles of the insert 260 and/or angles of the channel walls, as further described herein, for example with respect to FIG. 5D The applicator 108 may include a flange 240. The flange 240 may extend around a perimeter of the beam window 235. The flange 240 may extend radially outward. The cross-sectional area of the flange 240 may be smaller than the cross-sectional area of the waveguide 204 and/or the waveguide channel 150. The flange 240 may act as a shield to reduce energy leakage outside the applicator 108 and may increase total energy transfer.

Figure 5A:
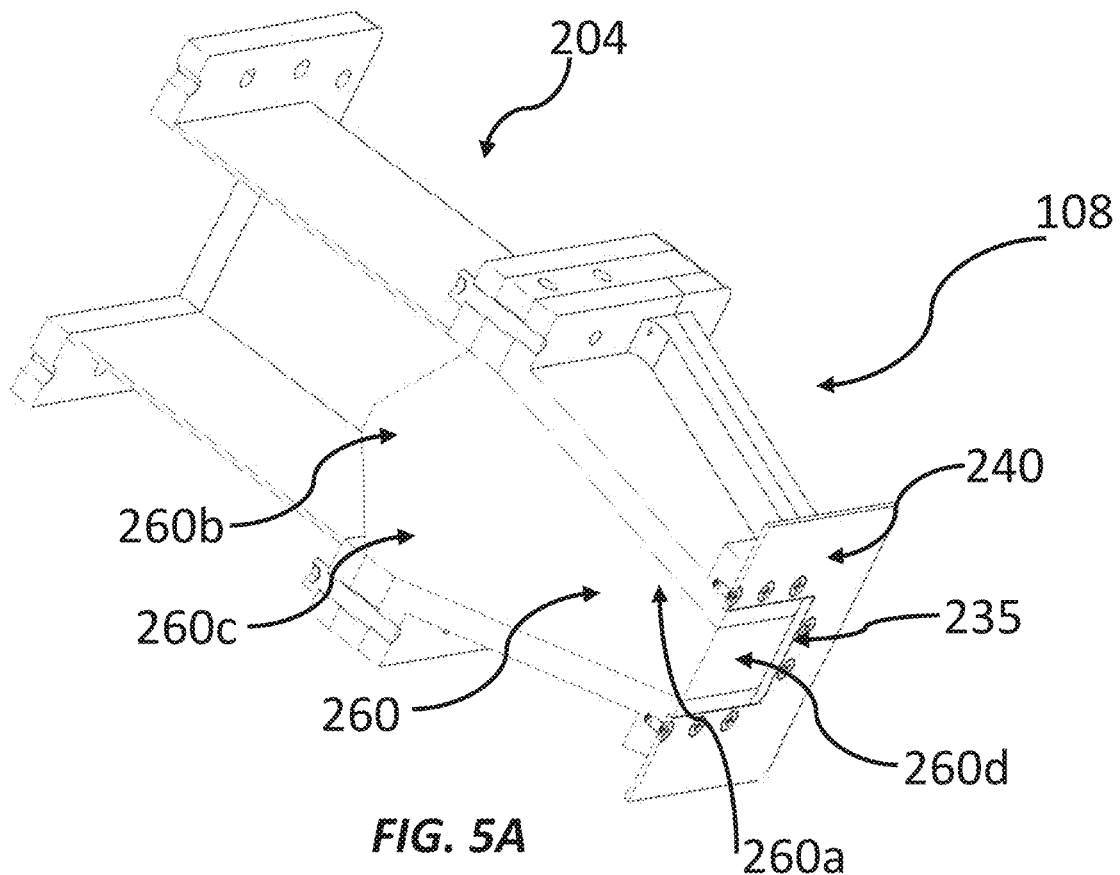
FIGS. 5A and 5B are cross-sectional perspective views of the applicator of FIG. 2 showing an insert therein.
Figure 5B:
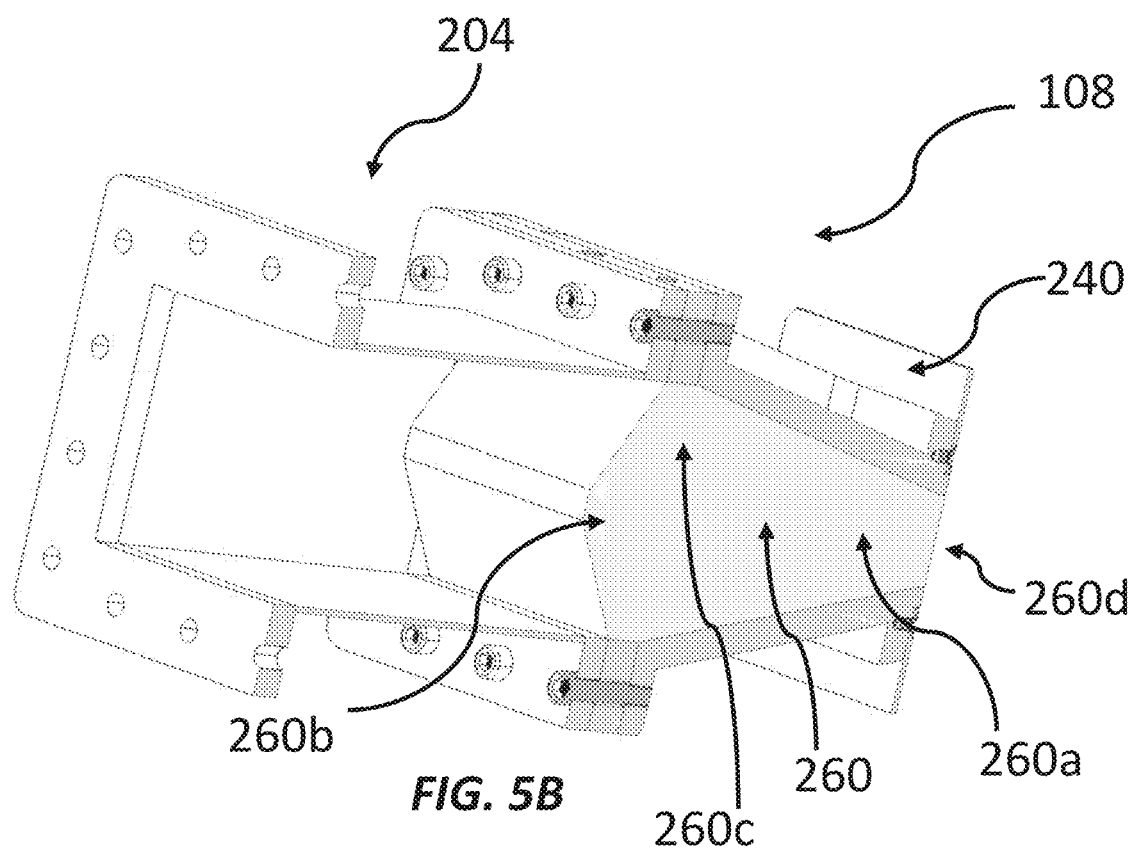

FIGS. 5A and 5B are cross-sectional perspective views of the applicator 108 having an insert 260. The applicator 108 may include the insert 260 that may be located at least partially within the channel 250. The insert 260 may completely fill the channel 250. There may be no gap between an outer part of the insert 260 and an inner surface of the channel 250, such as an inner surface of the sidewall of the applicator 108. The insert 260 may completely extend across a cross-sectional portion of the channel 250. The insert 250 may extend longitudinally across some, most, or all of the channel 250. A surface of an end of the insert 260d may be located at the beam window 235. The surface may be planar. The surface may be coplanar with the window 235 and/or the flange 240. In some embodiments, the insert 260 may fit within the applicator channel 250 to not have any space or gap between the channel sidewalls and the insert 260. In some embodiments, the insert 260 may fill the entire volume of the channel 250.

The insert 260 may be made from microwave-transparent materials. The microwave-transparent materials may be dielectric. In some embodiments, the insert 260 may include microwave-transparent materials with different permittivity values. Permittivity values of the material of the insert 260 may include, but are not limited to, 1 to 15 Farad/m. In some embodiments, the insert may include a material with a permittivity value between that of air (1 Farad/m) and hard rock (15 Farad/m). In some embodiments, the material for the insert 260 may include Polytetrafluoroethylene (PTFE). PTFE may provide low loss and higher relative permittivity (2.1) than air (1), providing the transition into the rocks that have a relative permittivity of 5-12. In some embodiments, the material for the insert may include combinations of materials which have high microwave transparency. The insert 260 may be a single, solid mass. The insert 260 may be a solid dielectric. The insert 260 may provide a lensing effect. In some embodiments, the insert 260 may use lenses such as metamaterials. The material of the insert 260 may have high microwave transparency. In some embodiments, a window may be added, such as another piece of dielectric material.

The insert 260 may have different cross-sectional profiles, including, but not limited to, rectangular, circular, oval, and multi-sided. In some embodiments, the insert 260 may be pyramidal in structure. The cross-sectional area of the insert 260 may increase and then decrease in a distal direction from the applicator inlet 232 toward the exit to the applicator outlet 233.

The applicator 108 with the insert 260 may be an impedance or permittivity matching design. The applicator 108 may be configured, e.g., have a dielectric permittivity based on, the permittivity of the air and the rock type.

Figure 5C:
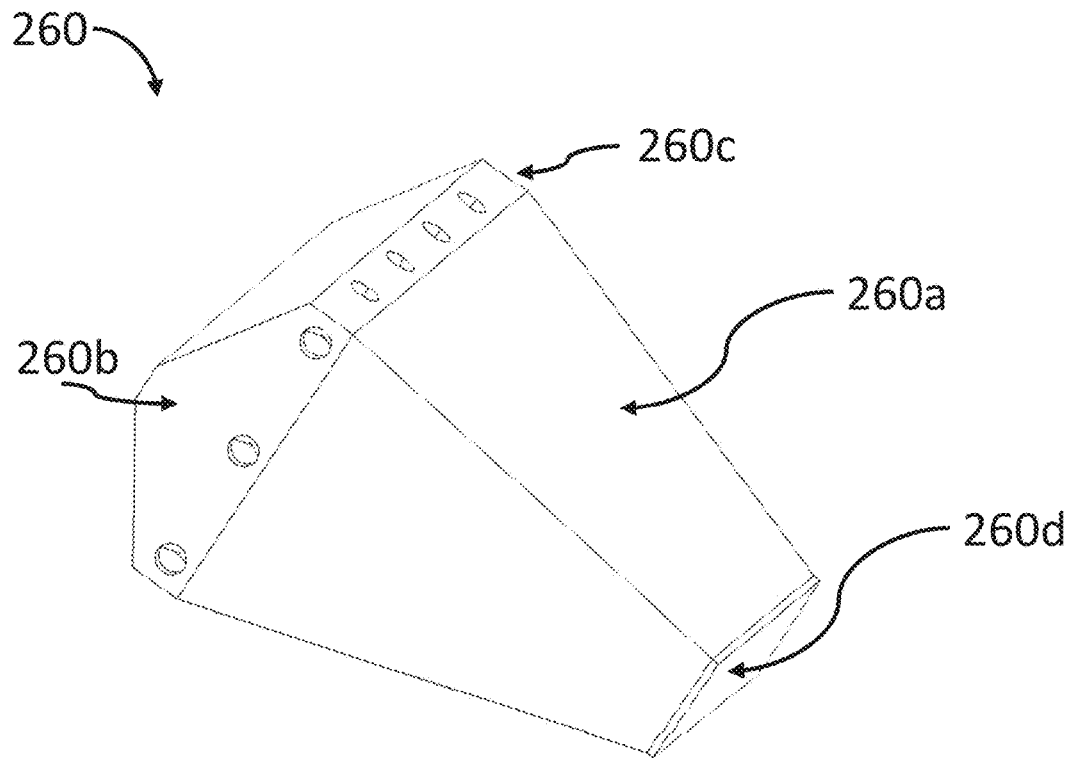
FIGS. 5C and 5D are perspective and cross-sectional views, respectively, of the insert of the applicator of FIG. 2 shown in isolation from the surrounding applicator structure.
Figure 5D:
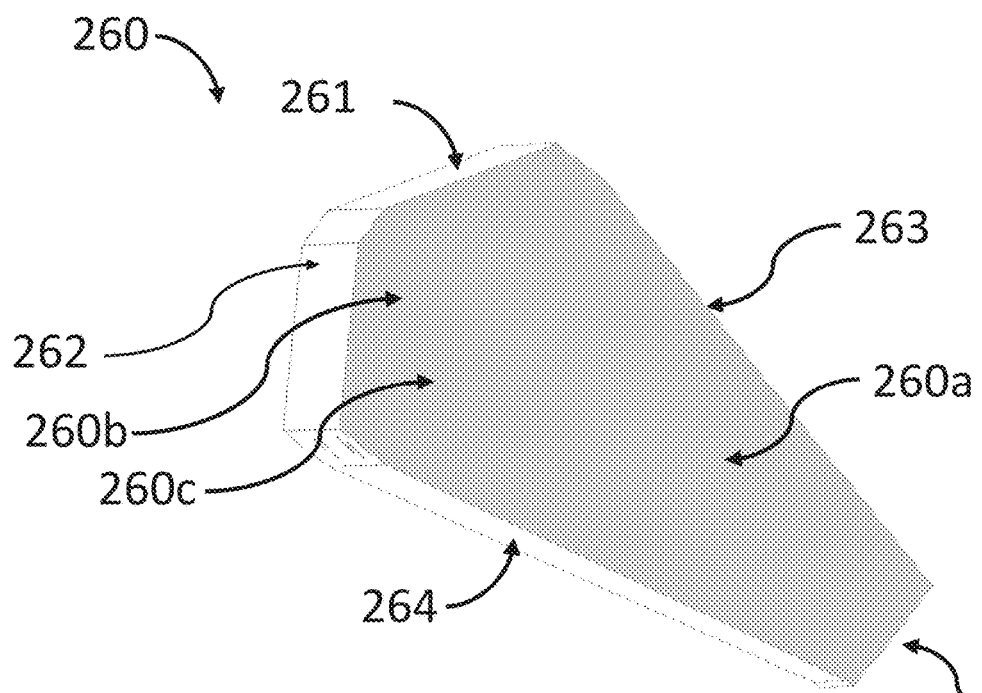

FIG. 5C is a perspective view of the insert 260 shown in isolation for clarity. FIG. 5D is a cross-sectional perspective view of the insert 260. In some embodiments, the insert 260 may define a first pyramidal structure 260a adjacent to a middle portion 260c. In some embodiments, the insert 260 may define a second pyramidal structure 260b adjacent to the middle portion 260c. FIGS. 5A and 5B are cross-sectional perspective views of the applicator 108 showing the insert 260 including the two pyramidal structures 260a and 260b and the middle portion 260c therebetween. FIG. 5C is a perspective view of the insert 260 shown in isolation for clarity including the two pyramidal structures 260a and 260b and the middle portion 260c therebetween.

As shown in FIGS. 5C and 5D, a shape of the insert 260 may be defined such that a base of the first pyramidal structure 260a is adjacent to the middle portion 260c. The middle portion 260c may be adjacent to a base of the second pyramidal structure 260b. The bases of the pyramidal structures 260a and 260b may be rectangular. A cross-sectional area of the middle portion 260c may be rectangular. A cross-sectional area of the base of the first pyramidal structure 260a may be the same or similar as a cross-sectional area of the middle portion 260c. A cross-sectional area of the base of the second pyramidal structure 260b may be the same or similar as the cross-sectional area of the middle portion 260c. In some embodiments, the first pyramidal structure 260a may be adjacent to the second pyramidal structure 260b, for example, there may not be a middle portion 260c.

A shape of the insert 260 may be defined such that the first pyramidal structure 260a, the middle portion 260c, and the second pyramidal structure 260b may form a continuous, solid structure. The shape of the insert 260 may be defined such that the first pyramidal structure 260a may taper inwardly in a first direction away from the middle portion 260c, and/or the second pyramidal structure 260b may taper inwardly in a second direction away from the middle portion 260c that is opposite the first direction. The first pyramidal structure 260a may taper inwardly away from the middle portion 260c in a distal direction towards the applicator outlet 233. The second pyramidal structure 260b may taper inwardly away from the middle portion 260c in a proximal direction towards the applicator inlet 232. In some embodiments, the applicator 260 may not include the first pyramidal structure 260a. In some embodiments, the applicator 260 may not include the second pyramidal structure 260b.

The insert 260 may fit within or otherwise be located in the applicator channel 250. The middle portion 260c may be adjacent to the first flange 236 (see FIG. 2) of the waveguide and/or the second flange 237 (see FIG. 2) of the applicator 108. The cross-sectional area of the first pyramidal structure 260a of the insert 260 may progressively decrease in a distal direction, e.g., in a direction from the applicator inlet 232 toward the applicator outlet 233. The cross-sectional area of the second pyramidal structure 260b of the insert 260 may progressively decrease in the proximal direction, e.g., in a direction from the waveguide outlet 231 toward the waveguide inlet 230. In some embodiments, for example, for use with microwaves of approximately 1 GHz frequency, the insert 260 may have an overall length of 230 mm and/or a maximum width of 248 mm.

In some embodiments, a first relative distance between two opposite walls of the pyramidal structure 260a of the insert 260 decreases in the distal direction, e.g., in a direction along the channel from the applicator inlet 232 toward the applicator outlet 233. In some embodiments, a second relative distance between the other two opposite walls of the pyramidal structure 260a of the insert 260 decreases in the distal direction, e.g., in a direction along the channel from the applicator inlet 232 to the applicator outlet 233. In some embodiments, a decrease of the first relative distance between two opposite walls of the pyramidal structure 260a may include decreases that minimize reflection of the microwave energy back to the waveguide segment 204. In some embodiments, a decrease of the second relative distance between the other two opposite walls of the pyramidal structure 260a may include decreases that minimize reflection of the microwave energy back to the waveguide segment 204. The decrease in the first and/or second distances may be continuous, as shown. In some embodiments, the decreases in the first or second distance may not be continuous, e.g., stepped, curved with inflection points, constant at portions, etc.

In some embodiments, a third relative distance between two opposite walls of the pyramidal structure 260b of the insert 260 decreases in a proximal direction, e.g., in a direction along the longitudinal channel from the waveguide outlet 231 towards the waveguide inlet 230. In some embodiments, a fourth relative distance between the other two opposite walls of the pyramidal structure 260b of the insert 260 decreases in the proximal direction, e.g., in a direction along the longitudinal channel from the waveguide outlet 231 towards the waveguide inlet 230. In some embodiments, a decrease of the third relative distance between two opposite walls of the pyramidal structure 260b may include decreases that minimize reflection of the microwave energy back to the waveguide segment 204. In some embodiments, a decrease of the fourth relative distance between the other two opposite walls of the pyramidal structure 260b may include decreases that minimize reflection of the microwave energy back to the waveguide segment 204. The decrease in the third and/or fourth distances may be continuous, as shown. For example, in some embodiments, for microwave frequency of 916 MHz, an angle formed between two opposite walls of the pyramidal structure 260b may be 116 degrees. In some embodiments, the decreases in the first or second distance may not be continuous, e.g. stepped, curved with inflection points, constant at portions, etc.

The applicator 108 may have various angles between the various surfaces of the insert 260. As shown in FIG. 5D, the surfaces 261 and 262 may form a first angle therebetween at a proximal end of the insert 260. The first angle may be from about 90 degrees to about 140 degrees, from about 95 degrees to about 135 degrees, from about 100 degrees to about 130 degrees, from about 105 degrees to about 125 degrees, or from about 110 degrees to about 120 degrees. The first angle may be about 115 degrees. The surfaces 263 and 264 may form a second angle therebetween at a distal end of the insert 260, which may be less than the first angle. The second angle may be from about 90 degrees to about 140 degrees, from about 95 degrees to about 135 degrees, from about 100 degrees to about 130 degrees, from about 105 degrees to about 125 degrees, or from about 110 degrees to about 120 degrees. The first angle may be about 115 degrees. The first and second angles may correspond to a frequency of emitted energy from about 850 MHz to about 950 MHz, from about 875 MHz to about 925 MHz, from about 910 MHz to about 920 MHz, or about 915 MHz. Further, the angles and/or frequencies may correspond to particular dimensions or ranges of dimensions for width and height of the beam window 235, such as those described herein with respect to FIG. 4.

Figure 6:
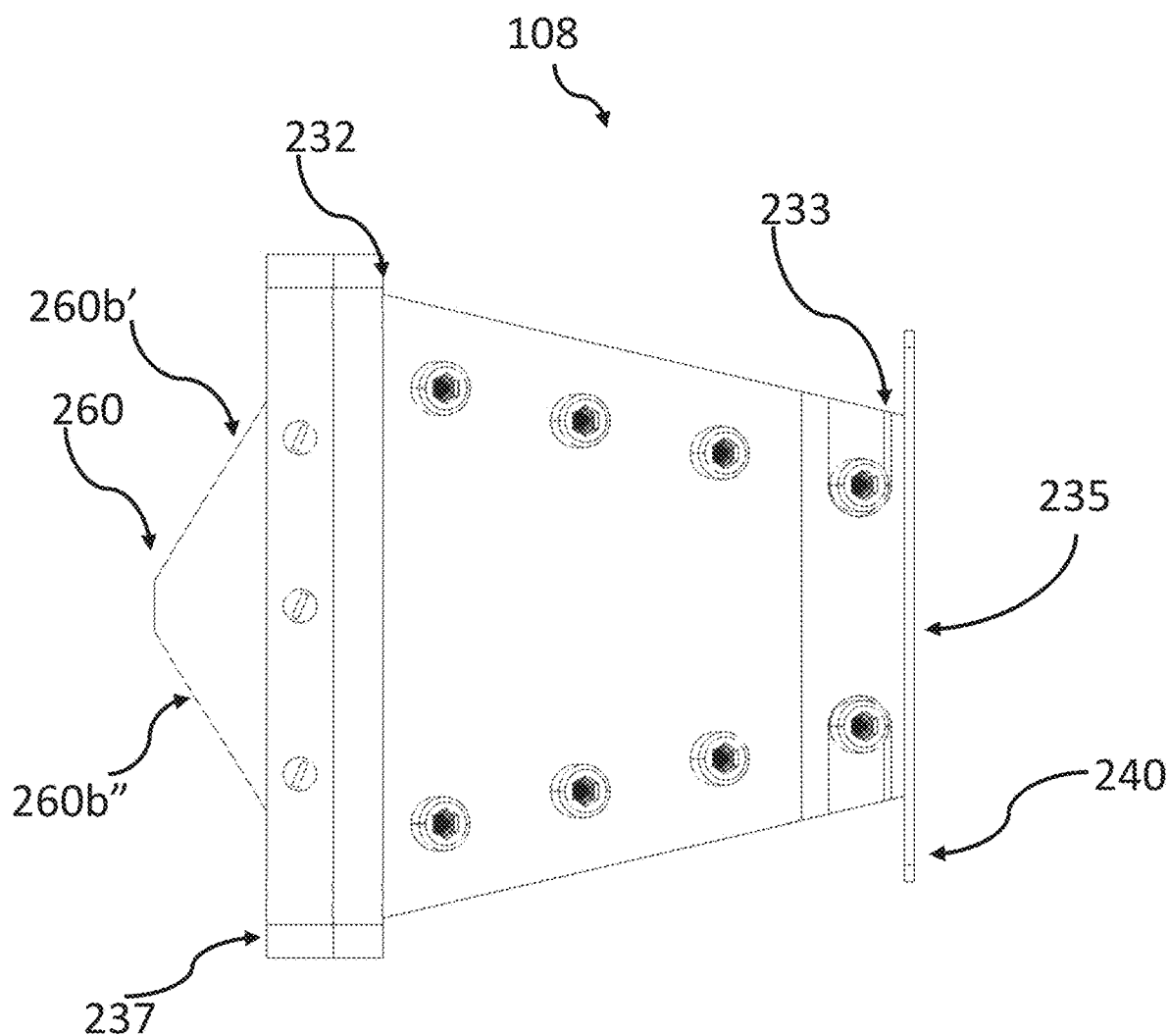
FIG. 6 is a side view of the applicator of FIG. 2.

FIG. 6 is a side view of the applicator 108, shown without the waveguide 204 for clarity, and depicting a proximal pyramidal structure of the insert 260 narrowing from the waveguide outlet 231 towards the waveguide inlet 230. The insert 260 may thus protrude proximally into the waveguide channel, for example into the terminal waveguide segment 204.

The microwaves exiting the waveguide segment 204 at the waveguide outlet 231 may enter the applicator 108 at the applicator inlet 232. The microwaves may continue to travel through the applicator channel 250 towards the outlet 233 where the microwaves may be transmitted as a beam through the beam window 235 for application to a material.

According to some embodiments of a mining system 100, microwaves generated by the generator 103 may be guided through the waveguide system 200 to the waveguide segment 204. The microwaves may enter the waveguide segment 204 through the waveguide inlet 230. The microwaves may then travel through the waveguide segment 204 via the waveguide channel 150 towards the waveguide outlet 231, where they may be received by the insert 260.

The microwaves may travel through the microwave-transparent material insert 260 towards the applicator outlet 233. The decreasing cross-sectional area of the insert 260 in a direction of propagation of the microwaves may alter an energy level of the microwaves. The decreasing cross-sectional area of the applicator 108 and the decreasing cross-sectional area of the insert 260 in the direction of propagation of the microwaves may also increase an energy density of the focused microwaves relative to the microwaves in the waveguide segment 204 by at least five times. The focused high-energy microwaves may travel to the applicator outlet 233 where they may be transmitted for application to the rock face via the beam window 235.

The permittivity value between that of air (1 Farad/m) and rock (5-15 Farad/m) of the microwave-transparent material of the insert 260 may cause a transmission loss of the microwave energy passing through the insert to be no more than −30 decibels (dB). The beam of the focused microwaves may be projected into a spot on a face of the rock that may be no more than one quarter (¼) the size of a wavelength of the beam. As the focused microwave beam is projected into a spot on a face of the rock, the flange around the tapered contact surface may further reduce transmission loss and may project more than 50 kilowatts (kW) into the rock.

Figure 7:
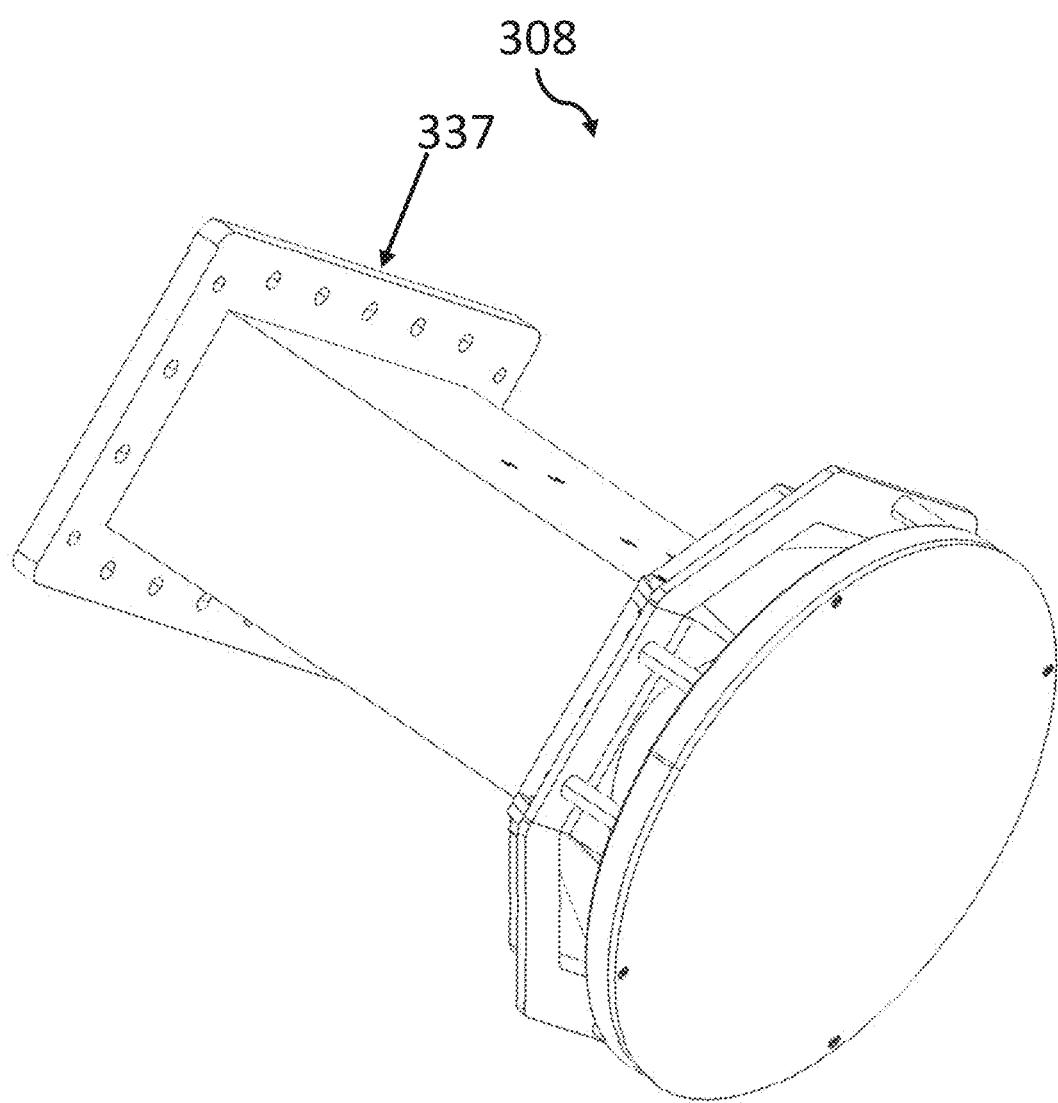
FIG. 7 is a perspective view of another embodiment of a microwave energy applicator having internal ridges that may be used with the system of FIG. 1A.

FIG. 7 is a perspective view of another embodiment of a microwave energy applicator 308 that may be used with the system of FIG. 1A. The applicator 308 may be connected to the waveguide segment 204, which may be as described herein, for example, with respect to FIGS. 1A-6. Thus, the waveguide segment 204 may have a rectangular cross-section, or other shape, and/or an internal channel defined by the waveguide segment 204 may thus be rectangular, and/or the waveguide segment 204 may be positioned at an end of the robotic arm 104 and may include a first flange 236 attached to a second flange 337 of the applicator 308, and/or one or more of the plurality of waveguide segments 204 may be included in the waveguide system 200 with flanges or similar attachments to attach the waveguide segments 204 to each other and/or to the microwave generator 103, and/or microwaves may enter the waveguide segment 204 at the waveguide inlet 230, travel through the waveguide segment via the waveguide channel 150 and exit the waveguide segment at the waveguide outlet 231, and travel into or toward the applicator 308, etc.

An applicator inlet 332 and the waveguide outlet 231 may have the same or similar cross-sectional area. The applicator inlet 332 and the waveguide outlet 231 may be aligned so that the applicator 308 may be connected to the waveguide segment 204. A continuous channel with smooth inner surfaces of the sidewalls may be formed between the waveguide inlet 230 and an applicator outlet 333.

Figure 8A:
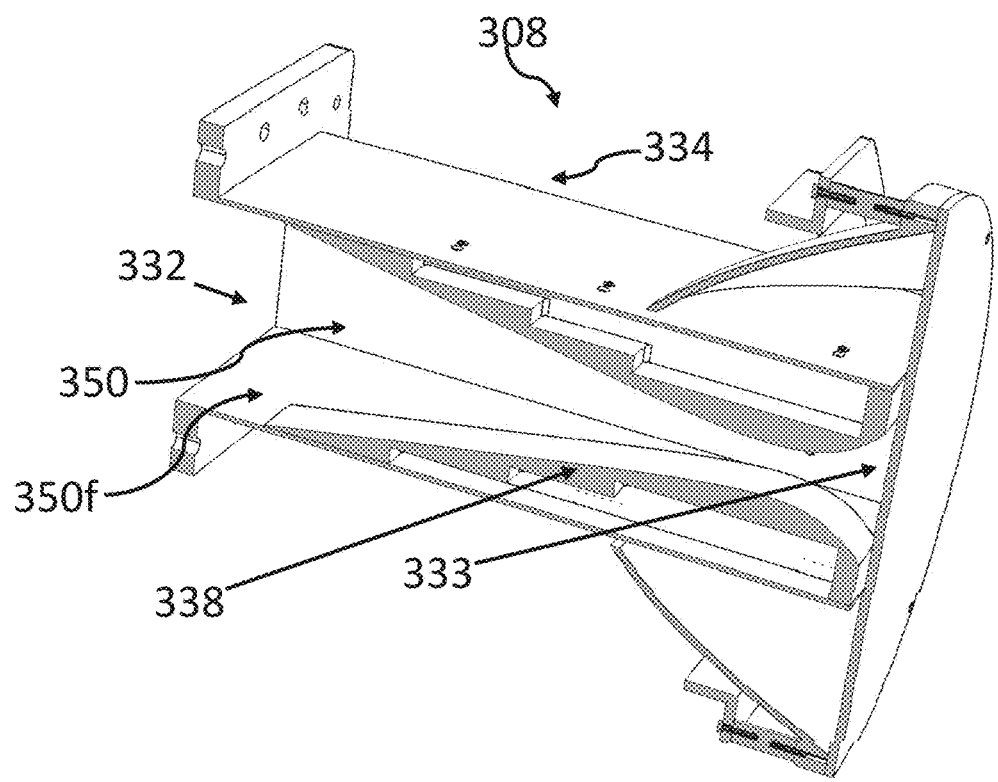
FIG. 8A is a cross-sectional perspective view of the applicator of FIG. 7.

FIG. 8A is a cross-sectional perspective view of the microwave energy applicator 308 of FIG. 7. The microwave energy applicator 308 may include a body 334 defining a channel 350 that extends longitudinally from an applicator inlet 332 to an applicator outlet 333. The channel 350 may be in electromagnetic communication with a waveguide channel 150 of the waveguide segments 204 forming the robotic arm 104. The space within the waveguide channel 150 may be continuous with the space within the channel 350. The applicator inlet 332 and applicator outlet 333 may have the same or different cross-sectional profiles, including, but not limited to, rectangular, circular, oval, and multi-sided. The applicator inlet 332 may have a larger cross-sectional area than the applicator outlet 333. The cross-sectional area of the channel 350, or portions thereof, may narrow from the applicator inlet 332 to the applicator outlet 333, for example, due to various structures protruding inwardly into the channel, as further described.

The applicator 308 may include one or more ridges 338. The applicator 308 may have no dielectric insert, such as in the applicator 108. The applicator 308 may thus eliminate the need for a dielectric. The ridges 338 may provide impedance matching. The applicator 308 with the ridges 338 may be a "broadband" design, in that it may maintain matching for a large range of rock permittivities.

As shown, there may be two ridges 338. The two ridges 338 may be located opposite each other, for example 180 degrees apart. The two ridges 338 may be located in other angular positions. In some embodiments, there may be three, four, five, six, seven, eight, nine ten or more of the ridges 338. The multiple ridges 338 may be evenly angularly spaced about the channel 350. The one or more ridges 338 may extend longitudinally within the channel 350. In some embodiments, the one or more ridges 338 may protrude radially inwardly into the channel 350 from one or more inner walls 350f of the channel 350. The one or more ridges 338 may protrude radially inwardly various distances at various locations along the channel 350, as further described. The one or more ridges 338 may be located within the channel 350 abutting one or more inner walls 350f of the channel 350. The one or more ridges 338 may be parallel to the one or more inner walls 350f of the channel 350 abutting the one or more ridges 338. In some embodiments, varying cross-sectional thickness of the one or more ridges 338 into the channel, from the applicator inlet 332 to the applicator outlet 333, may cause narrowing of the channel 350 or portions thereof. Such narrowing minimizes reflection of the microwave energy, for example, in a proximal direction back toward the terminal waveguide segment 204. In some embodiments, an angle of narrowing of the channel 350 from the applicator inlet 332 to the applicator outlet 333 may include an angle or angles of narrowing that allow different levels of collimation of a transmitted microwave beam.

Figure 8B:
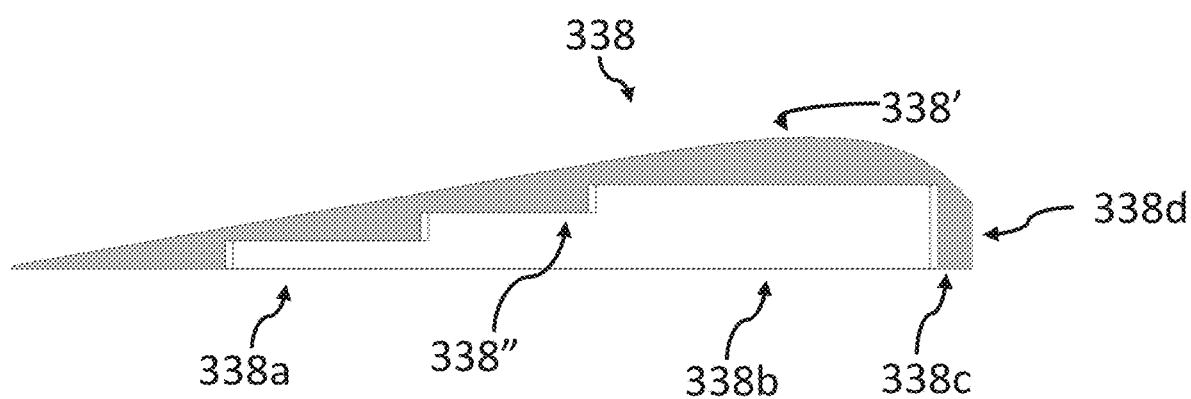
FIG. 8B is a cross-sectional side view of an internal ridge of the applicator of FIG. 7 shown in isolation.

FIG. 8B is a longitudinal, cross-sectional side view of an example of the one or more ridges 338. In some embodiments, the ridge 338 may include a proximal portion 338a which may be located near the applicator inlet 332, a distal portion 338c which may be located near the applicator outlet 333, and a middle portion 338b located between the proximal and distal portions 338a and 338c. In some embodiments, a cross-sectional thickness of the ridge 338 may increase in a distal direction from the proximal portion 338a to the middle portion 338b. In some embodiments, a cross-sectional thickness of the ridge 338 may decrease in a distal direction from the middle portion 338b to the distal portion 338c. In some embodiments, at least a part of the middle portion 338b of the ridge 338 is curved. In some embodiments, the ridge 338 may taper inwardly at or near the distal portion 338c, which may be located near the applicator outlet 333. In some embodiments, the ridge 338 may include a smooth outer surface 338', which may be an upper surface as oriented in FIG. 8B and which may face inwardly into the channel 350. The smooth outer surface 338' may face away from the channel wall 350f which the ridge 338 abuts. In some embodiments, the ridge 338 may include internal voids 338". The voids 338" may be empty regions of the ridge 338, which may reduce the weight of the ridge 338. The voids 338" may include multiple surfaces, e.g., with steps as shown, and which may face the channel wall 350f.

In some embodiments, the one or more ridges 338 may be configured to transmit microwave energy efficiently onto and/or into a material located in an outside area near the applicator outlet 333. In some embodiments, the material may be rock. In some embodiments, the one or more ridges 338 may include a shape where at least a part of the ridge 338 has an airfoil shape. In some embodiments, the one or more ridges 338 may include shapes which allow focusing of microwaves. In some embodiments, the one or more ridges 338 may include shapes which allow altering of energy levels of microwaves.

In some embodiments, the one or more ridges 338 may be configured to move. The one or more ridges 338 may be configured to move in a longitudinal direction along a length of the applicator channel 350. In some embodiments, this movement of the one or more ridges 338 along the length of the applicator channel 350 may be configured to optimize transmission of microwave energy onto and/or into the material in the outside area near the applicator outlet 333. Sensors may detect one or more parameters associated with the energy applied or otherwise within the channel 350, and the one of more ridges 338 may be moved based on such detection.

Figure 9:
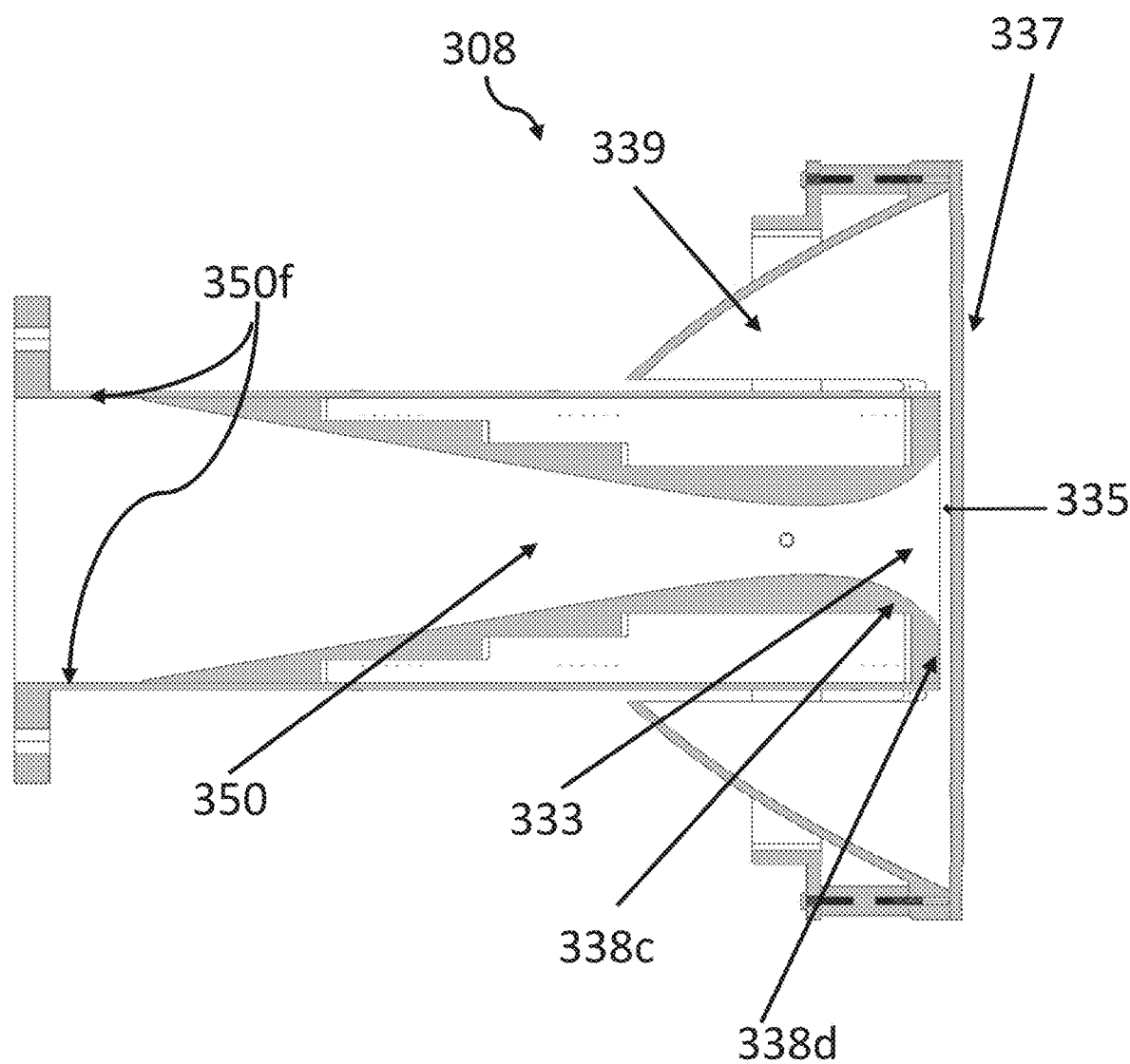
FIG. 9 is a cross-sectional side view of the applicator of FIG. 7.
Figure 10:
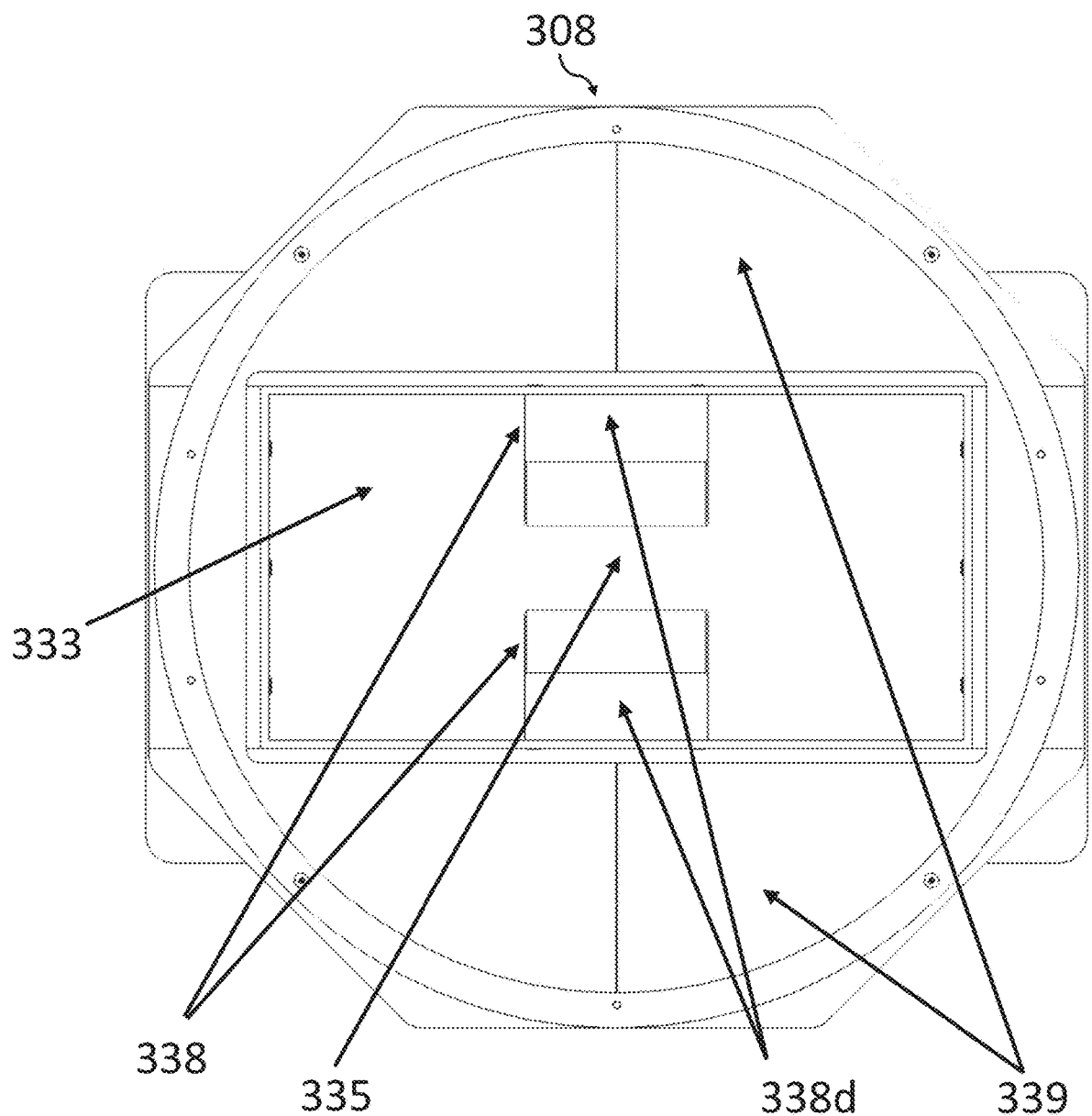
FIG. 10 is a cross-sectional front view of the applicator of FIG. 7.

FIG. 9 is a cross-sectional side view of the microwave energy applicator 308. FIG. 10 is a front view of the microwave energy applicator 308. The applicator outlet 333 may form a central portion 335 through which a microwave beam may be transmitted. Transmission of the microwave energy received from the waveguide segment 204 through the central portion 335 may allow concentration of the received energy relative to the energy within the waveguide channel 150. In some embodiments, dimensions of the central portion 335 may include dimensions that allow different levels of collimation of the transmitted microwave beam. In some embodiments, at least a part of the distal portion 338c of the one or more ridges 338 may include a surface 338d located at the applicator outlet 333. The surface may be planar. In some embodiments, at least one edge of the central portion 335 is formed by an edge of the surface 338d of the one or more ridges 338.

In some embodiments, the applicator 308 may include the flange 240 (see FIG. 4). The flange 240 may extend around a perimeter of the central portion 335. The flange 240 may extend radially outward. The cross-sectional area of the flange 240 may be smaller than the cross-sectional area of the waveguide 204 and/or the waveguide channel 150. The flange 240 may act as a shield to reduce energy leakage outside the applicator 308 and may increase total energy transfer.

In some embodiments, the applicator 308 may include a reflector 339 located near the applicator outlet 333. The reflector 339 may surround the applicator outlet 333. The reflector 339 may have an outer circular shape as shown, with a rectangular cutout inner section. The reflector 339 includes a reflective surface. In some embodiments, the reflector 339 may have a parabolic shape. In some embodiments, the reflector 339 may have a spherical, rounded, conical, segmented, or other shape. In some embodiments, the applicator 308 may be suspended in the middle of the reflector 309. In some embodiments, the applicator 308 may be suspended in the middle of the reflector 309 using posts and clamps. In some embodiments, the posts include dielectric material. In some embodiments, the applicator 308 may be electrically isolated from the reflector 339.

In some embodiments, the reflector 339 may be configured to increase transmission efficiency of the microwave energy applicator 308. In some embodiments, the reflector 339 may be configured to minimize reflection and/or minimize leakage of the transmitted microwave energy. In some embodiments, the reflector 339 may be configured to allow different levels of collimation of the transmitted microwave beam. In some embodiments, the reflector may be configured to maximize a penetration depth of the transmitted microwave beam into a material.

In some embodiments, the applicator 308 may include a dust cover 337. In some embodiments, the dust cover 337 may be attached to the reflector 339. In some embodiments, the dust cover 337 may include microwave-transparent material. In some embodiments, the dust cover 337 may include a dielectric radome. In some embodiments, the dust cover 337 may reduce damage to the applicator 308. The dust cover 337 may be circular and cover a distal end of the applicator 308. The dust cover 337 may be removed prior to use of the applicator 308 for energy transmission.

Figure 11:
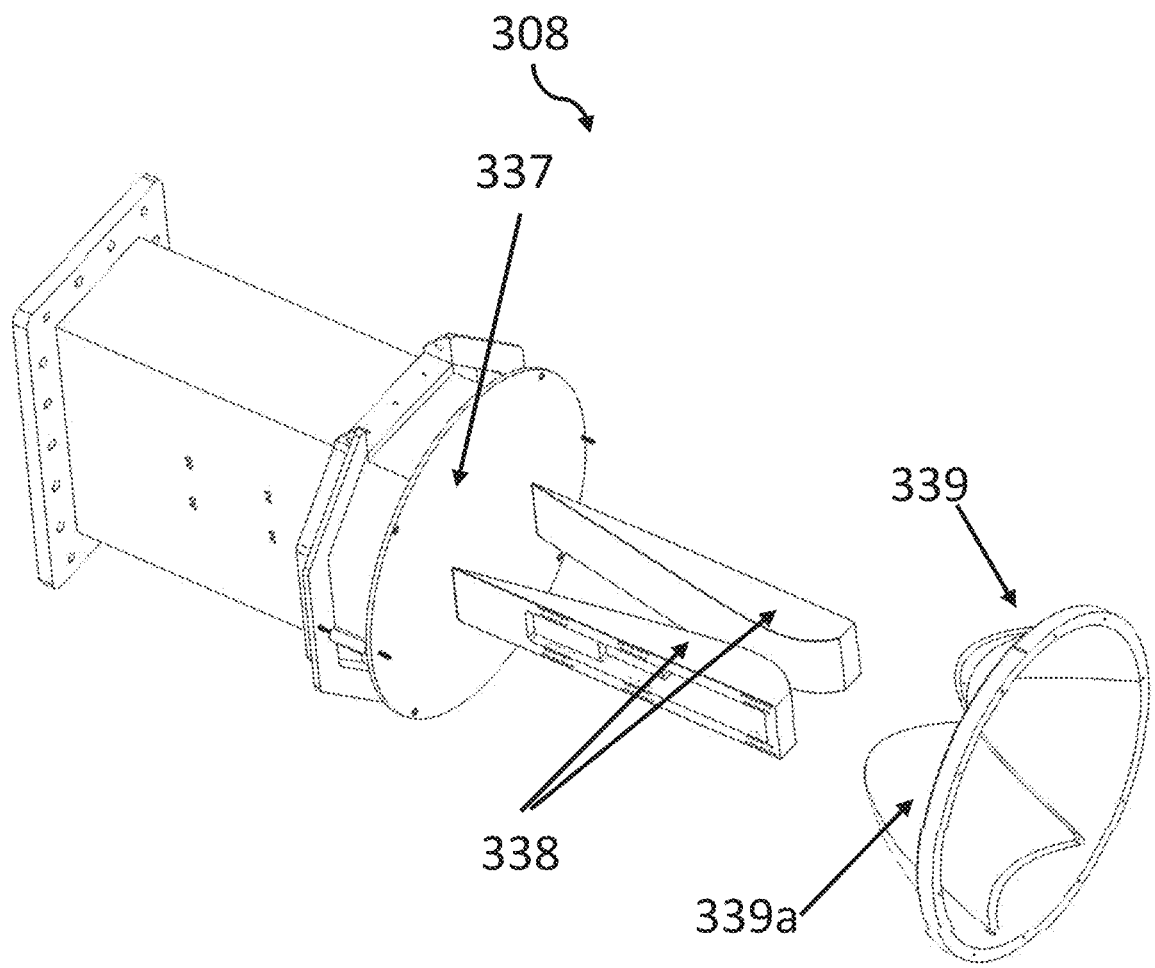
FIG. 11 is an exploded perspective view of the applicator of FIG. 7.

FIG. 11 is an exploded perspective view of the microwave energy applicator 308 of FIG. 7. The applicator 308 may have a rectangular shape, as shown. The two ridges 338 may be located diametrically opposite each other within a channel 350 of the applicator. The reflector 339 may have an outer circular shape, such as parabolic, extending in a proximal direction from the outlet 333 towards the applicator inlet 332. The outer circular shape of the reflector 339 may have a cutout inner section 339a. The cutout inner section 339a may be rectangular as shown. The cutout inner section 339a of the reflector 339 may have a same or similar cross-sectional area as a cross-sectional area of the applicator outlet 333. The reflector 339 may be configured so that the cutout inner section 339a may fit around the applicator outlet 333, such as over the rectangular portion defining the channel therein. The reflector 339 may be configured so that the reflector 339 may be fitted around the applicator outlet 333 by sliding in a longitudinal direction of the applicator channel body.

In various embodiments, microwaves exiting the waveguide segment 204 at the waveguide outlet 231 may enter the applicator 308 at the applicator inlet 332. The microwaves may continue to travel through the applicator channel 350 towards the outlet 333 where the microwaves may be transmitted as a beam through the central portion 335 for application to a material.

According to some embodiments of the mining system 100, microwaves generated by the generator 103 may be guided through the waveguide system 200 to the waveguide segment 204. The microwaves may enter the waveguide segment 204 through the waveguide inlet 230. The microwaves may then travel through the waveguide segment 204 via the waveguide channel 150 towards the waveguide outlet 231, where they may be received by the applicator inlet 332.

The microwaves may travel through the applicator channel 350 towards the applicator outlet 333. In some embodiments, narrowing of the applicator channel 350 and impedance altering caused by the one or more ridges 338 in a direction of propagation of the microwaves may alter an energy level and/or pattern of the microwaves. The decreasing cross-sectional area of the applicator 308 in the direction of propagation of the microwaves may also increase an energy density of the focused microwaves relative to the microwaves in the waveguide segment 204 by at up to two, three, four, five or more times relative to the energy within the waveguide channel 150. The focused high-energy microwaves may travel to the applicator outlet 333 where they may be transmitted for application to the rock face at the central portion 335. In some embodiments, the applicator 308 may be configured to increase focusing and/or transmission of microwave energy of different frequency spectrums. In some embodiments, the applicator 308 may be configured to be less sensitive to air gap and/or surface roughness of materials relative to other conventional applicator designs.

The beam of the focused microwaves may be projected into a spot on a face of the rock that may be no more than one quarter (¼) the size of a wavelength of the beam. As the focused microwave beam is projected into a spot on a face of the rock, the flange around the tapered contact surface may further reduce transmission loss and may project more than 50 kilowatts (kW) into the rock.

According to some embodiments, the energy being transmitted by the waveguide system 200 may be measured in real time by a sensor attached to the waveguide system 200. One or more sensors may be attached to the waveguide segment 204. The energy being emitted from the microwave generator may be measured. The energy being transmitted through the applicator 108 into the rock may be measured. The energy may be measured in both directions in the waveguide system 200 (for example, the entry energy and the exit energy). The transmitted and/or reflected power may also be measured. The power entering the surrounding environment may be measured.

By tracking and/or measuring the energy and/or power, a user may see what power and/or energy is being applied to the rock and/or material. Further, the energy transmission and reflection measurements may be used to determine temperature. This may be beneficial as rock electromagnetic characteristics may change with temperature.

The one or more sensors may also be configured to track audible and/or visual indications of cracking at the surface and/or within the rock or material. Ground penetrating radar may also be used for real time and/or post degradation determination.

Various modifications to the embodiments described in this disclosure will be readily apparent to those skilled in the art, and the generic principles defined herein may be applied to other embodiments without departing from the spirit or scope of this disclosure. Thus, the disclosure is not intended to be limited to the embodiments discussed herein but is to be accorded the widest scope consistent with the claims, the principles and the novel features disclosed herein. The word "example" is used exclusively herein to mean "serving as an example, instance, or illustration." Any embodiment described herein as "example" is not necessarily to be construed as preferred or advantageous over other embodiments, unless otherwise stated.

Certain features that are described in this specification in the context of separate embodiments also may be embodied in combination in a single embodiment. Conversely, various features that are described in the context of a single embodiment also may be embodied in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the order shown or in sequential order, or that all illustrated operations be performed, to achieve desirable results. Additionally, other embodiments are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A microwave-based system for mining rock, the system comprising:
   a microwave generator;
   a robotic arm connected with the microwave generator and comprising a waveguide segment configured to guide therethrough microwaves generated by the microwave generator; and
   an applicator located at an end of the robotic arm, the applicator comprising a longitudinal channel defined by a sidewall extending longitudinally from an applicator inlet to an applicator outlet, the longitudinal channel configured to guide therethrough microwaves from the waveguide segment through the applicator outlet for application to the rock, wherein at least a portion of the longitudinal channel comprises at least one longitudinal ridge protruding into the longitudinal channel in between the applicator inlet and the applicator outlet and configured to alter an energy level of the microwaves.

2. The system of claim 1, wherein the at least one longitudinal ridge abuts at least one inner wall of the longitudinal channel.

3. The system of claim 2, wherein the at least one longitudinal ridge comprises a smooth outer surface facing away from the abutting inner wall of the longitudinal channel.

4. The system of claim 1, wherein the at least one longitudinal ridge comprises a proximal portion located near the inlet of the longitudinal channel, a distal portion located near the outlet of the longitudinal channel, and a middle portion located between the proximal portion and the distal portion, and wherein a cross-sectional thickness of the at least one longitudinal ridge protruding into the longitudinal channel increases from the proximal portion to the middle portion.

5. The system of claim 4, wherein the cross-sectional thickness of the at least one longitudinal ridge protruding into the longitudinal channel decreases from the middle portion to the distal portion.

6. The system of claim 4, wherein at least a part of the distal portion comprises a planar surface located at the outlet of the longitudinal channel, wherein the outlet comprises a window, and wherein the planar surface forms at least one edge of the window.

7. The system of claim 4, wherein the at least one longitudinal ridge tapers inwardly at or near the distal portion.

8. The system of claim 1, comprising two of the longitudinal ridges.

9. The system of claim 8, wherein the two longitudinal ridges are located on opposite inner walls of the longitudinal channel.

10. The system of claim 1, wherein the at least one longitudinal ridge is movable.

11. The system of claim 10, wherein the at least one longitudinal ridge is movable along a length of the longitudinal channel.

12. The system of claim 1, further comprising a reflector connected at the outlet of the longitudinal channel.

13. The system of claim 12, further comprising a dust cover connected to the reflector and covering the outlet of the longitudinal channel, wherein the dust cover comprises a microwave transparent material.

14. The system of claim 1, wherein the robotic arm is articulable and comprises at least two rigid waveguide segments rotatably attached together.

15. The system of claim 1, further comprising a control system configured to move the robotic arm to control a location of the applicator.

16. A method of applying microwaves to rock, the method comprising:
generating microwaves;
guiding the microwaves through a waveguide;
receiving the microwaves from the waveguide into an applicator comprising a longitudinal channel defined by a continuous sidewall extending from an inlet to an outlet, and at least one ridge protruding into the longitudinal channel a first distance at a first location along the longitudinal channel and a second distance at a second location along the longitudinal channel that is greater than the first distance to alter an energy level of the microwaves; and
focusing the microwaves into the rock.

17. The method of claim 16, further comprising re-orienting the applicator relative to the rock.

18. The method of claim 16, wherein a varying thickness of the at least one ridge along a longitudinal length of the longitudinal channel causes a narrowing of a cross-sectional area of the longitudinal channel.

19. The method of claim 16, wherein the energy level of the microwaves is altered by a movement of the at least one ridge in a longitudinal direction of the longitudinal channel.

20. An apparatus for focusing microwaves, the apparatus comprising:
a body defining a longitudinal channel that extends from an inlet to an outlet; and
at least one longitudinal ridge protruding into the longitudinal channel from an inner wall of the body,
wherein at least a part of the at least one longitudinal ridge comprises an airfoil shape.

21. The apparatus of claim 20, wherein the at least one longitudinal ridge comprises a proximal portion located near the inlet of the longitudinal channel, a distal portion located near the outlet of the longitudinal channel, and a middle portion located between the proximal portion and the distal portion, and wherein a cross-sectional thickness of the at least one longitudinal ridge protruding into the longitudinal channel increases from the proximal portion to the middle portion.

22. The apparatus of claim 21, wherein the cross-sectional thickness of the at least one longitudinal ridge protruding into the longitudinal channel decreases from the middle portion to the distal portion.

23. The apparatus of claim 20, wherein the at least one longitudinal ridge is movable.

24. The apparatus of claim 20, wherein the at least one longitudinal ridge is movable along a length of the channel.

25. The apparatus of claim 20, further comprising a reflector connected at the outlet of the longitudinal channel and a dust cover connected to the reflector and covering the outlet of the longitudinal channel, wherein the dust cover comprises a microwave transparent material.

26. The apparatus of claim 20, wherein a cross-sectional area of the inlet of the longitudinal channel is larger than a cross-sectional area of the outlet of the longitudinal channel.

27. An apparatus for focusing microwaves, the apparatus comprising:
a body defining a longitudinal channel that extends from an inlet to an outlet; and
two longitudinal ridges protruding into the longitudinal channel from an inner wall of the body;
wherein the two longitudinal ridges are located on opposite inner walls of the longitudinal channel.

28. A microwave-based system for mining rock, the system comprising:
a microwave generator;
a robotic arm connected with the microwave generator and comprising a waveguide segment configured to guide therethrough microwaves generated by the microwave generator; and
an applicator located at an end of the robotic arm, the applicator defining a channel configured to guide therethrough microwaves from the waveguide segment through an exit for application to the rock, wherein at least a portion of the channel that decreases in cross-sectional area towards the exit comprises an insert configured to alter an energy level of the microwaves.

29. The system of claim 28, wherein a surface of an end of the insert is located at or near a window of the exit.

30. The system of claim 28, wherein the insert comprises a dielectric filler comprising microwave transparent material.

31. The system of claim 28, wherein the insert comprises two pyramidal structures adjacent each other, wherein a distal portion decreases in cross-sectional area towards the exit and a proximal portion decreases in cross-sectional area away from the exit.

32. The system of claim 28, wherein the waveguide segment defines a channel having a first permittivity, the insert has a second permittivity that is greater than the first permittivity, and the rock has a third permittivity that is greater than the second permittivity.

33. The system of claim 28, wherein the end of the insert is coplanar with a window of the exit.

34. The system of claim 28, wherein there is no gap between the insert and sidewalls of the channel.

* * * * *